(12) United States Patent
Kim et al.

(10) Patent No.: US 12,046,003 B2
(45) Date of Patent: Jul. 23, 2024

(54) METHOD AND SYSTEM FOR VISUAL LOCALIZATION

(71) Applicant: NAVER LABS Corporation, Seongnam-si (KR)

(72) Inventors: Deok Hwa Kim, Seongnam-si (KR); Dong Hwan Lee, Seongnam-si (KR); Woo Young Kim, Seongnam-si (KR); Tae Jae Lee, Seongnam-si (KR)

(73) Assignee: NAVER LABS CORPORATION, Gyoenggi-Do (KR)

( * ) Notice: Subject to any disclaimer, the term of this patent is extended or adjusted under 35 U.S.C. 154(b) by 197 days.

(21) Appl. No.: 17/524,845

(22) Filed: Nov. 12, 2021

(65) Prior Publication Data
US 2022/0148219 A1 May 12, 2022

(30) Foreign Application Priority Data
Nov. 12, 2020 (KR) .................. 10-2020-0150674

(51) Int. Cl.
*G06T 7/73* (2017.01)
*G06F 18/213* (2023.01)
(Continued)

(52) U.S. Cl.
CPC ............. *G06T 7/74* (2017.01); *G06F 18/213* (2023.01); *G06F 18/253* (2023.01); *G06T 7/11* (2017.01);
(Continued)

(58) Field of Classification Search
CPC .................................. G06T 7/74; G06T 7/55
See application file for complete search history.

(56) References Cited

U.S. PATENT DOCUMENTS

2012/0087272 A1* 4/2012 Lemkin .................. G01S 5/10
370/252
2014/0314322 A1* 10/2014 Snavely .................. G06T 7/74
382/190
(Continued)

FOREIGN PATENT DOCUMENTS

JP 2013-171455 A 9/2013
JP 2020-518917 A 6/2020
(Continued)

OTHER PUBLICATIONS

Office Action dated Oct. 11, 2022 issued in corresponding Japanese Appln. No. 2021-178860.
(Continued)

*Primary Examiner* — Yi Yang
(74) *Attorney, Agent, or Firm* — Harness, Dickey & Pierce, P.L.C.

(57) ABSTRACT

A visual localization method includes generating a first feature point map by using first map data calculated on the basis of a first viewpoint; generating a second feature point map by using second map data calculated on the basis of a second viewpoint different from the first viewpoint; constructing map data for localization having the first and second feature point maps integrated with each other, by compensating for a position difference between a point of the first feature point map and a point of the second feature point map; and performing visual localization by using the map data for localization.

20 Claims, 30 Drawing Sheets

(51) Int. Cl.
- *G06F 18/25* (2023.01)
- *G06T 7/11* (2017.01)
- *G06T 7/55* (2017.01)
- *G06T 17/05* (2011.01)
- *G06V 10/75* (2022.01)
- *G06V 20/13* (2022.01)
- *G06V 20/56* (2022.01)

(52) U.S. Cl.
CPC ............... *G06T 7/55* (2017.01); *G06T 17/05* (2013.01); *G06V 10/751* (2022.01); *G06V 20/13* (2022.01); *G06V 20/56* (2022.01); *G06T 2200/08* (2013.01); *G06T 2207/20021* (2013.01); *G06T 2207/20132* (2013.01); *G06T 2207/20221* (2013.01); *G06T 2207/30244* (2013.01); *G06T 2207/30252* (2013.01)

(56) References Cited

U.S. PATENT DOCUMENTS

| | | | |
|---|---|---|---|
| 2019/0026958 A1* | 1/2019 | Gausebeck | H04N 13/10 |
| 2019/0139255 A1* | 5/2019 | Shih | G05B 19/02 |
| 2020/0125846 A1* | 4/2020 | Laughlin | B29C 70/30 |
| 2020/0174492 A1* | 6/2020 | Lee | G05D 1/0219 |
| 2020/0302510 A1* | 9/2020 | Chachek | G06Q 30/0639 |
| 2020/0309541 A1* | 10/2020 | Lavy | G06V 20/588 |
| 2020/0309542 A1* | 10/2020 | Haug | G05D 1/0236 |
| 2020/0357143 A1 | 11/2020 | Chiu et al. | |

FOREIGN PATENT DOCUMENTS

| | | |
|---|---|---|
| JP | 2020-144710 A | 9/2020 |
| KR | 10-2018-0087947 A | 8/2018 |
| KR | 10-2019-0121275 A | 10/2019 |
| KR | 10-2020-0118677 A | 10/2020 |

OTHER PUBLICATIONS

Office Action dated Aug. 23, 2022 issued in corresponding Korean patent application No. 10-2020-0150674.

Korean Notice of Allowance dated Feb. 14, 2023 issued in corresponding Korean Appln. No. 10-2020-0150674.

Japanese Notice of Allowance dated Apr. 4, 2023 issued in corresponding Japanese Appln. No. 2021-178860 (with English translation).

* cited by examiner (a)

(b)

METHOD AND SYSTEM FOR VISUAL LOCALIZATION

CROSS-REFERENCE TO RELATED APPLICATION

Pursuant to 35 U.S.C. § 119(a), this application claims the benefit of the earlier filing date and the right of priority to Korean Patent Application No. 10-2020-0150674, filed on Nov. 12, 2020, the entire contents of which are incorporated herein by reference.

BACKGROUND

1. Technical Field

At least one example embodiment relates to a method of generating a map which is utilizable for visual localization, and a visual localization method and system using the map.

2. Description of the Related Art

Location determination technologies have been developed as various types of systems such as global positioning system (GPS), inertial sensor-based localization, visual localization, simultaneous localization and mapping (SLAM), and visible light communication (VLC) are correlated to each other.

Among such location determination technologies, the visual localization is a technology that includes searching for a position through captured pictures. When compared with GPS, visual localization may provide advantages in the form of smaller error and more precise measurement of a direction that a user faces. However, for visual localization, a map for specifying a position through a comparison with captured pictures should be established.

Recently, as on-line map generation techniques have been highly developed, many IT companies are providing map information on outdoor spaces and corresponding services.

As such an example, commercialization has occurred with respect to a street view function for capturing images while a car moves along a roadway, and then providing the captured images when a user requests a street view image of a specific spot on an electronic map. As another example, a method of generating a 3D map by using aerial photos captured from the air by an airplane, a drone, etc. is being actively developed.

Since such 3D model data which is based on aerial photos has image information and a street view image is based on images, they can be utilized as data to construct a map for visual localization. Thus, a method using a street view image and 3D model data which is based on aerial photos may be considered in order to generate a map for visual localization.

Acknowledgement: This invention was supported by Development of innovation technology for ICT industry convergence (R & D) program of MSIT (Ministry of Science and ICT) and IITP (Institute of Information & Communications Technology Planning & Evaluation). [1711125948, 2019-0-01309-003, Development of AI Technology for Guidance of a Mobile Robot to its Goal with Uncertain Maps in Indoor/Outdoor Environments, Jan. 1, 2021~Dec. 31, 2021, Lead Organization: Electronics and Telecommunications Research Institute].

SUMMARY

Therefore, an aspect of at least one example embodiment is to provide a method and system of generating a map for visual localization, by utilizing a street view image and 3D model data which is based on aerial photos.

More specifically, at least one example embodiment may provide a method of generating a 3-dimensional feature point map which is utilizable for visual localization on a road or sidewalk, by using a street view image and 3D model data together.

Further, at least one example embodiment may implement visual localization for estimating a 3D position and a pose with just a sheet of image, by utilizing a feature point map.

In order to achieve these and other advantages and in accordance with the purpose of this specification, as embodied and broadly described herein, there is provided a visual localization method and system capable of generating map data for localization by matching a first feature point map and a second feature point map generated from data at different viewpoints with each other, by using a difference of a camera pose.

According to at least some example embodiments, a visual localization method includes generating a first feature point map by using first map data calculated on the basis of a first viewpoint; generating a second feature point map by using second map data calculated on the basis of a second viewpoint different from the first viewpoint; constructing map data for localization having the first and second feature point maps integrated with each other, by compensating for a position difference between a point of the first feature point map and a point of the second feature point map; and performing visual localization by using the map data for localization.

The first viewpoint may be one of a road viewpoint or an aerial viewpoint, and the second viewpoint may be another of the road viewpoint or the aerial viewpoint.

The generating of the first feature point map may include detecting feature points of objects which satisfy a specific condition, from each of street view images captured at the road viewpoint; generating a 3-dimensional point related to at least one of the street view images based on matching among the feature points; and generating data provided at the first feature point map by compensating for the 3D point and a pose of the at least one street view image.

The at least one street view image may be cropped into a plurality of images, and the detecting of the feature points may be performed with respect to the cropped plurality of images.

The generating of the second feature point map may include rendering an image of an outdoor space viewed from a virtual camera, by using a pose of the virtual camera and 3D model data; and generating data provided at the second feature point map by using the rendered image and a pose of the virtual camera, wherein the 3D model data is generated based on the image of the outdoor space captured at the aerial viewpoint.

The generating of the data provided at the second feature point map may include extracting a feature point of an object positioned at the outdoor space by using the rendered image, and extracting a 3D coordinate of the feature point by using a rendered depth map.

The constructing of the map data for localization may include calculating correspondences of feature points between an image of the first feature point map and an image of the second feature point map; and estimating a change of the camera pose with respect to the point of the first feature point map and the point of the second feature point map, by using the correspondences.

The image of the first feature point map may be provided with a street view image captured at a road viewpoint, and the image of the second feature point map may be provided with an image rendered at the road viewpoint by using 3D model data of an outdoor space.

The street view image may be provided with a plurality of image tiles, and the plurality of image tiles may be matched with the rendered image.

The method may further include compensating the camera pose corresponding to one of the first and second feature point maps based on another of the first and second feature point maps, through error optimization among the feature points of the image of the first feature point map and the image of the second feature point map.

The method may further include matching one of the first feature point map and the second feature point map with another feature point map by scan matching.

The second feature point map may be provided with mesh information, and the first and second feature point maps may be matched with each other by comparing 3D points of the first feature point map with the mesh information of the second feature point map.

The performing of the visual localization may include extracting a feature point by receiving an input image; extracting a reference image having data similar to the feature point of the input image from the map data for localization; and estimating a pose by using the reference image.

According to at least some example embodiments, a visual localization system includes a data base configured to store map data for localization; and a driving unit executed in a mobile device or an autonomous driving device, and configured to perform visual localization by using the map data for localization and images captured by the mobile device or the autonomous driving device, wherein the map data for localization is provided with a first feature point map and a second feature point map, wherein the first feature point map is generated by using first map data calculated based on a first viewpoint, wherein the second feature point map is generated by using second map data calculated based on a second viewpoint different from the first viewpoint, and wherein the first and second feature point maps are matched with each other by using a difference of a camera pose therebetween.

According to at least some example embodiments, a computer-readable medium stores computer-executable program instructions that, when executed by a processor, cause the processor to perform operations including generating a first feature point map by using first map data calculated on the basis of a first viewpoint; generating a second feature point map by using second map data calculated on the basis of a second viewpoint different from the first viewpoint; constructing map data for localization having the first and second feature point maps integrated with each other, by compensating for a position difference between a point of the first feature point map and a point of the second feature point map; and performing visual localization by using the map data for localization.

[Effects of at Least Some Example Embodiments]

In the visual localization method and system according to at least one example embodiment, weakness of data is compensated by generating map data by using data at different viewpoints. This enables visual localization to be performed by using an image at a sidewalk viewpoint.

Further, since the map data for localization is configured through matching of the first and second feature point maps generated from data at different viewpoints, advantages of the different feature point maps may be implemented. Especially, a street view image and an aerial photo-based 3D model are used together. In case of the street view image, there is a problem that only an image of a vehicle viewpoint exists without an image captured at a sidewalk. And the aerial photo-based 3D model has a problem that a virtual image is used and a texture of a low-rise building is crushed. However, the problems are compensated for each other.

More specifically, map data is acquired from a 3D point which is based on a matched street view image, and a 3D point obtained from an aerial photo-based model. (1) Since a substantially-captured street view image is utilized, local and global feature matching is performed well and thereby precise localization is possible. (2) And since image rendering is performed at various viewpoints (views which perform VL: a road, a crosswalk, etc.) by using aerial photos, a more stable service is possible.

Further, according to at least one example embodiment, a map is generated by using pre-established data. This may allow a map generation without a previous scan process with respect to outdoor environments. This may enhance efficiency in time and costs.

Further, according to at least one example embodiment, localization is performed by utilizing a 3D map reconstructed to a sidewalk viewpoint. Accordingly, there is an advantage that a 3D position and a pose can be estimated with just a sheet of image.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
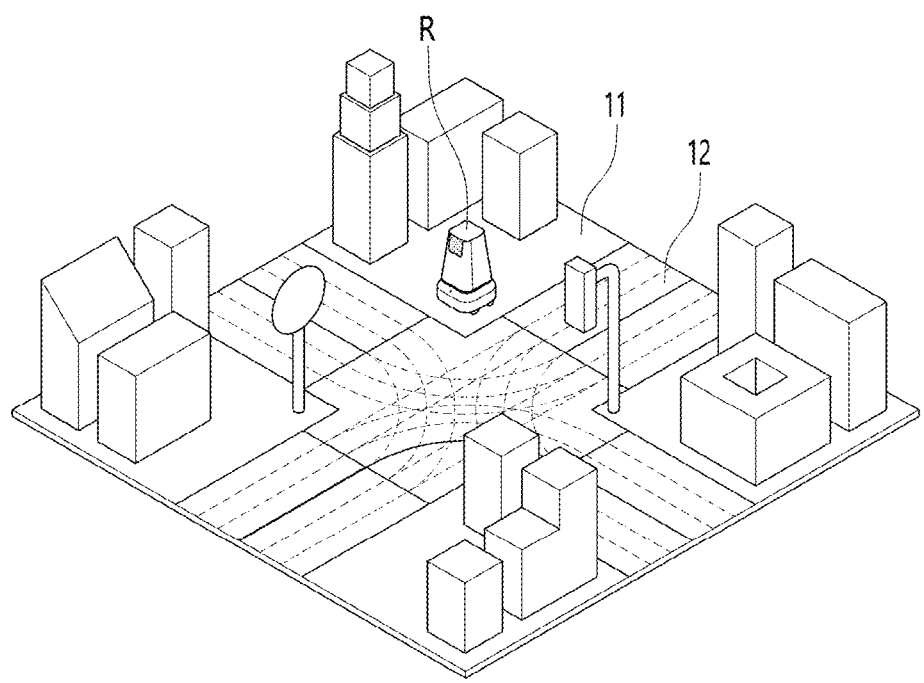
FIG. 1 is a conceptual view for explaining an operation to perform visual localization according to at least one example embodiment.

Description will now be given in detail according to example embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. According to at least one example embodiment, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, at least some example embodiments should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

At least one example embodiment is related to a method of generating a map which is utilizable for visual localization, and a visual localization method and system using the map. More specifically, at least one example embodiment may provide a system which performs visual localization in the air, at the ocean, on the road and sidewalk, etc., by combining a street view image with 3D model data which is based on aerial photos.

A street view function provided online is a function to show an image (or a picture or a video) in a direction selected by a user on a specific spot of an electronic map. Here, the spot is a position where a street view picture is captured, and may exist at intervals of a desired or, alternatively, predetermined distance, e.g., 10 m.

A street view image used at such a street view function is a panoramic photograph formed by capturing multi-directional photos by a plurality of cameras, and then by connecting the photos to each other. A user can see multi-directional photos at one spot, by turning the panoramic photograph by 360 degrees. More specifically, the street view image shown according to at least one example embodiment may be a spherical panoramic image of 360 degrees.

Like this, since the street view image is a panoramic photograph, a user may obtain substantial information on a corresponding space by looking at the 360-degree panoramic photograph by controlling a direction at a corresponding spot.

Meanwhile, the street view image may be an image captured at a road viewpoint. For instance, a car obtains images while moving along a roadway, thereby generating a panoramic photograph. Thus, the street view image may be an image viewed from a roadway, more specifically, a vehicle road, which is referred to as an image captured at a road viewpoint according to at least one example embodiment.

However, at least some example embodiments are not limited to this. That is, the street view image may be an image captured at a different viewpoint or in a different manner.

According to at least one example embodiment, the aerial pictures may be referred to as a meaning to include aerial photos, aerial video images, aerial images, etc. Here, the aerial photos mean photos captured by cameras mounted in an airplane, an airship, a balloon, a drone, etc., and are mainly used to analyze environments and resources through creation of a topographic map and reading, to analyze shapes, etc.

In this case, a captured area may be established as 3D model data by processing a multiview image of the aerial photo. The 3D model data may include information on a 3D rendering image, an orthophotograph, a Digital Surface Model (DSM), a Digital Elevation Model (DEM), etc.

The rendering or image synthesis indicates a process of creating an image from models or scene files containing them, by using a computer program. The 3D rendering means a process of generating an image of a final result by providing a color and a texture to a model manufactured by 3D computer graphics, by forming a structure with a camera angle, and then by performing shading with light. Here, the image of the final result may be an image of the 3D rendering.

The orthophotograph is an image obtained after removing a displacement of an object, which has occurred due to a camera pose and a landform relief at the time of capturing a photo, which may be an image generated like a map of the same scale by compensating for distortion on a photo occurring according to a height of a ground surface.

The digital surface model is a model including all of relief features which are a natural shape of the ground surface, and topographic features which are an artificial shape of the ground surface. And the digital elevation model may be a model representing a shape of a bare earth by storing an elevation value of the ground surface in a digital manner. However, the 3D model data according to at least one example embodiment is not limited to a single data set. For instance, it is possible that the 3D rendering image and the digital elevation model are obtained from different data sets, respectively.

According to at least one example embodiment, one feature point map for visual localization is generated by using the street view image, and another feature point map for the visual localization is generated by using the 3D model data.

The feature point map is a map having data on a 3D feature point, which may be referred to as a feature map, a distance map or a 3D feature point map. In this embodiment, shown is a map utilized for visual localization at a street such as a roadway or a sidewalk. However, the roadway or sidewalk is merely an example of a spot where visual localization is performed. The feature point map according to at least one example embodiment may be also utilizable for aerial visual localization. Hereinafter, for convenience, at least some example embodiments will be explained with having visual localization on a sidewalk as an example.

The sidewalk means a walkway constructed together with a road where vehicles, etc. pass. The sidewalk is installed on both sides of a roadway, which allows both men and vehicles to pass corresponding areas and distinguishes their routes from each other. The sidewalk may be used to specify a pavement installed next to a roadway. However, at least some example embodiments are not limited to this. That is, the sidewalk is defined as a meaning which commonly calls a lane where persons pass.

The visual localization in the air, at the ocean, on the road and sidewalk, etc. means visual localization to check a precise self-position by using an image captured for the periphery without using GPS in the air, at the ocean, on the road and sidewalk, etc. Here, the visual localization on the sidewalk may mean checking a user's position from a peripheral image captured by the user who moves on foot.

According to at least one example embodiment, the visual localization executed by using the preview image and the 3D model data may be performed at a mobile device or an autonomous driving device.

The mobile device may be a mobile terminal which is held by hand or which is wearable on the body, and the autonomous driving device may be a mobile device configured to be moveable autonomously.

For instance, the mobile terminal may include a portable phone, a smart phone, a laptop computer, a digital broadcasting terminal, personal digital assistants (PDA), a portable multimedia player (PMP), a navigation device, a slate PC, a tablet PC, an ultrabook, a wearable device, for instance, a smartwatch, smart glasses, a head mounted display (HMD), etc. And the autonomous driving device may be an autonomous driving vehicle, a drone, a robot, etc. Here, the robot may be a robot which provides a position-based service while moving, such as a cleaning robot, a guiding robot and a delivery robot.

According to at least some example embodiments, a new type of localization method and system for obtaining a position on a sidewalk or obtaining a position while a user moves on foot is explained on the basis of a position of the mobile device or the autonomous driving device. However, at least some example embodiments are not limited to this. That is, the mobile device or the autonomous driving device is understood as a means to measure a user's position, and other devices may be also applicable to at least some example embodiments.

Like this, the method of generating a map which is utilizable for visual localization, and a visual localization method and system using the map provide a user with current position information. For this, used are a map generated by using a street view image and a map generated by using aerial photos. Hereinafter, visual localization and a system for implementing the same will be explained firstly, and then a method of generating a map used for localization such visual localization will be explained in more detail with reference to the drawings.

Figure 2:
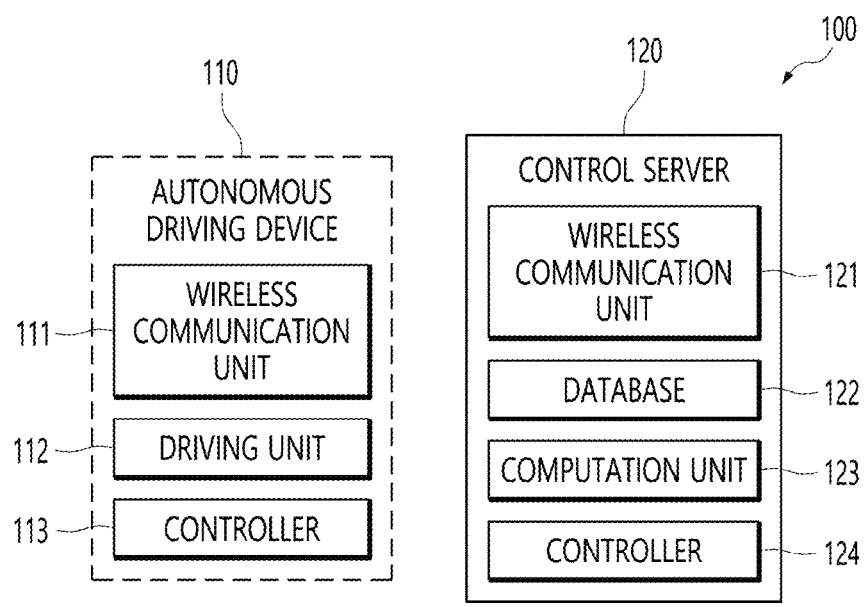
FIG. 2 is a view showing an example of a system which implements the visual localization of FIG. 1.

FIG. 1 is a conceptual view for explaining an operation to perform visual localization according to at least one example embodiment, and FIG. 2 is a view showing an example of a system which implements the visual localization of FIG. 1.

Referring to FIG. 1, a robot (R) serving as an autonomous driving device is positioned at an outdoor space. The robot may be a service robot such as a delivery robot or a guidance robot. However, there is no restriction on a type of a space where the robot (R) moves, and the robot is configured to drive in at least one of an indoor space and an outdoor space according to a necessity. In this embodiment, the robot (R) may be configured to drive on a sidewalk 11 where persons move on foot, in order to perform an allocated task such as a service provision.

In order to provide various services by using the robot (R), it is a very important factor that the robot (R) checks its position precisely and rapidly. Thus, the robot (R) may rapidly perform visual localization while driving through the sidewalk 11.

As an example of such visual localization, the robot (R) captures an image on one sidewalk 11 with viewing another sidewalk based on a roadway 12, and searches for its position by comparing the captured image with a 3D map. In this case, it takes a lot of efforts and time to generate a 3D map by obtaining images viewed from the sidewalk 11.

According to at least one example embodiment, map data for visual localization is generated by using pre-established data, i.e., a street view image and 3D model data. This may allow a map generation without a previous scan process with respect to outdoor environments.

Also, the visual localization on the sidewalk 11 may be implemented through a visual localization system 100 shown with reference to FIG. 2.

The visual localization system 100 may include an autonomous driving device 110 and a control server 120. However, as aforementioned, the autonomous driving device 110 is shown as a robot (R) in this embodiment, and may be replaced by a mobile device.

The autonomous driving device 110 may be provided with at least one of a wireless communication unit 111, a driving unit 112 and a controller 113.

The wireless communication unit 111 is configured to perform a wireless communication between the autonomous driving device and a control server, between the autonomous driving device and another autonomous driving device, between the autonomous driving device and a mobile device, and between the autonomous driving device and a communication network. For such a performance of a wireless communication, the wireless communication unit 111 may be provided with a wireless internet module, a short-distance communication module, a location information module, etc.

The driving unit 112 may be executed at the autonomous driving device or a mobile device under control of the controller. The driving unit 112 is configured to perform visual localization by using map data for localization and images captured by the autonomous driving device or the mobile device. In order to perform visual localization, the driving unit 112 may be provided with an image sensor, etc.

The map data for localization is map data utilizable for visual localization at a viewpoint of the sidewalk positioned near the roadway 12, which may be a feature point map manufactured for visual localization.

The controller 113 is configured to control a wireless communication, capture images, control the driving unit 112, and control the overall operations of the autonomous driving device or a mobile device. According to at least some example embodiments, any or all of the wireless communication unit 111, driving unit 112 and a controller 113 may be embodied by a circuit or circuitry. In this case, the map data for localization may be provided to the autonomous driving device 110 from the control server 120, or may be utilized to visual localization at the control server 120 by request of the autonomous driving device 110. The control server may be provided with at least one of a wireless communication unit 121, a database 122, a computation unit 123 and a controller 124.

The wireless communication unit 121 performs a wireless communication with the autonomous driving device 110 under control of the controller 124. Also, the controller 124 controls a series of processes to generate, store and update map data for localization by interworking with the computation unit 123 and the database 122.

The database 122 stores therein the map data for localization, and the map data for localization may be provided with coordinates information, point cloud information, image information, pose information, etc.

The computation unit 123 may be configured to firstly generate the map data for localization, or to update the generated map data for localization. As another example, the computation unit 123 can replace the functions of the driving unit 112 of the autonomous driving device 110. For instance, the computation unit 123 may calculate a position of the autonomous driving device 110 through a data processing for visual localization, an operation or the like, by using images captured by the autonomous driving device 110.

According to at least one example embodiment, the map data for localization may be implemented by constructing a map by using a street view image and 3D model data generated based on aerial photos together.

Hereinafter, a method of constructing such map data for localization and performing visual localization will be explained in more detail with reference to the attached drawings.

Figure 3:
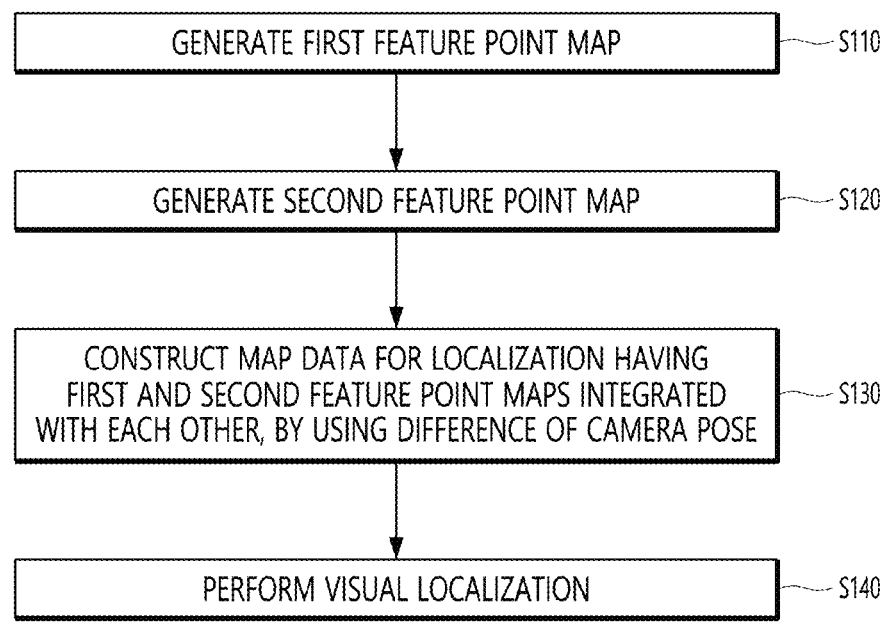
FIG. 3 is a flowchart for explaining processes to perform visual localization according to at least one example embodiment.
Figure 4:
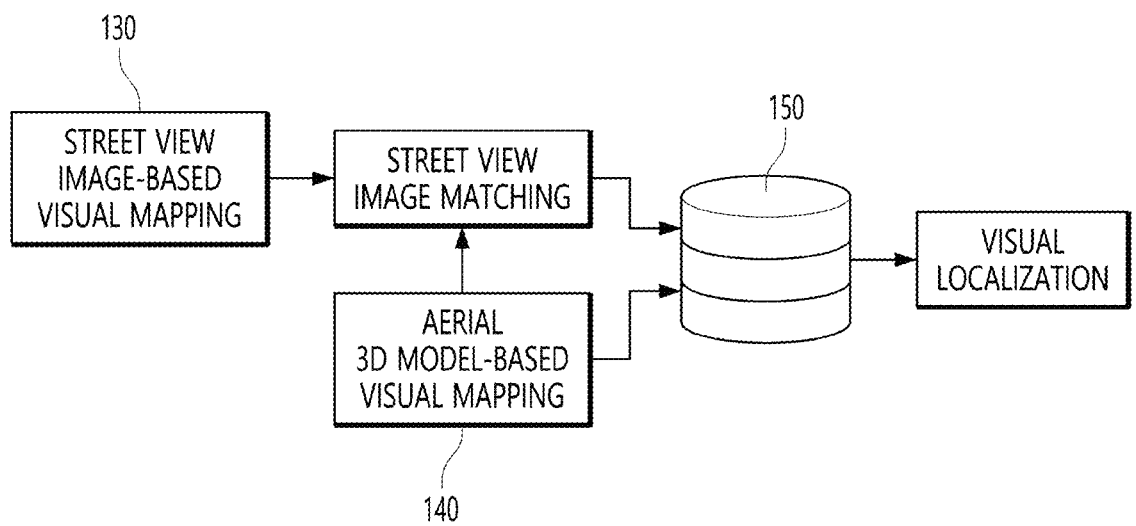
FIG. 4 is a conceptual view for explaining map data established by the processes of FIG. 3.
Figure 5:
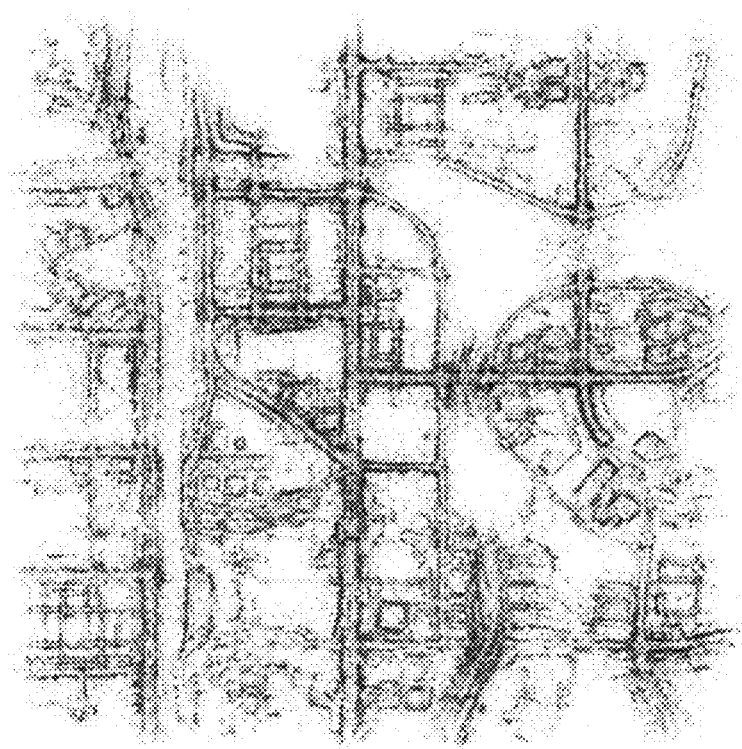
FIG. 5 shows pictures illustrating a feature point map based on a 3D model which is based on aerial photos, and a feature point map based on a street view image, respectively.
Figure 5:
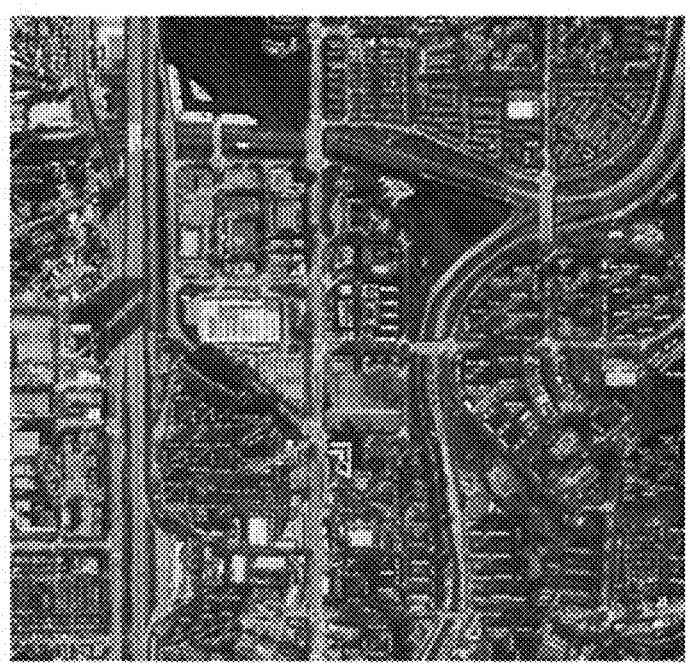
Figure 6A:
FIGS. 6A and 6B are conceptual views illustrating a mismatched example and a matched example, among coordinates of the data shown in FIG. 5, respectively.
Figure 6B:
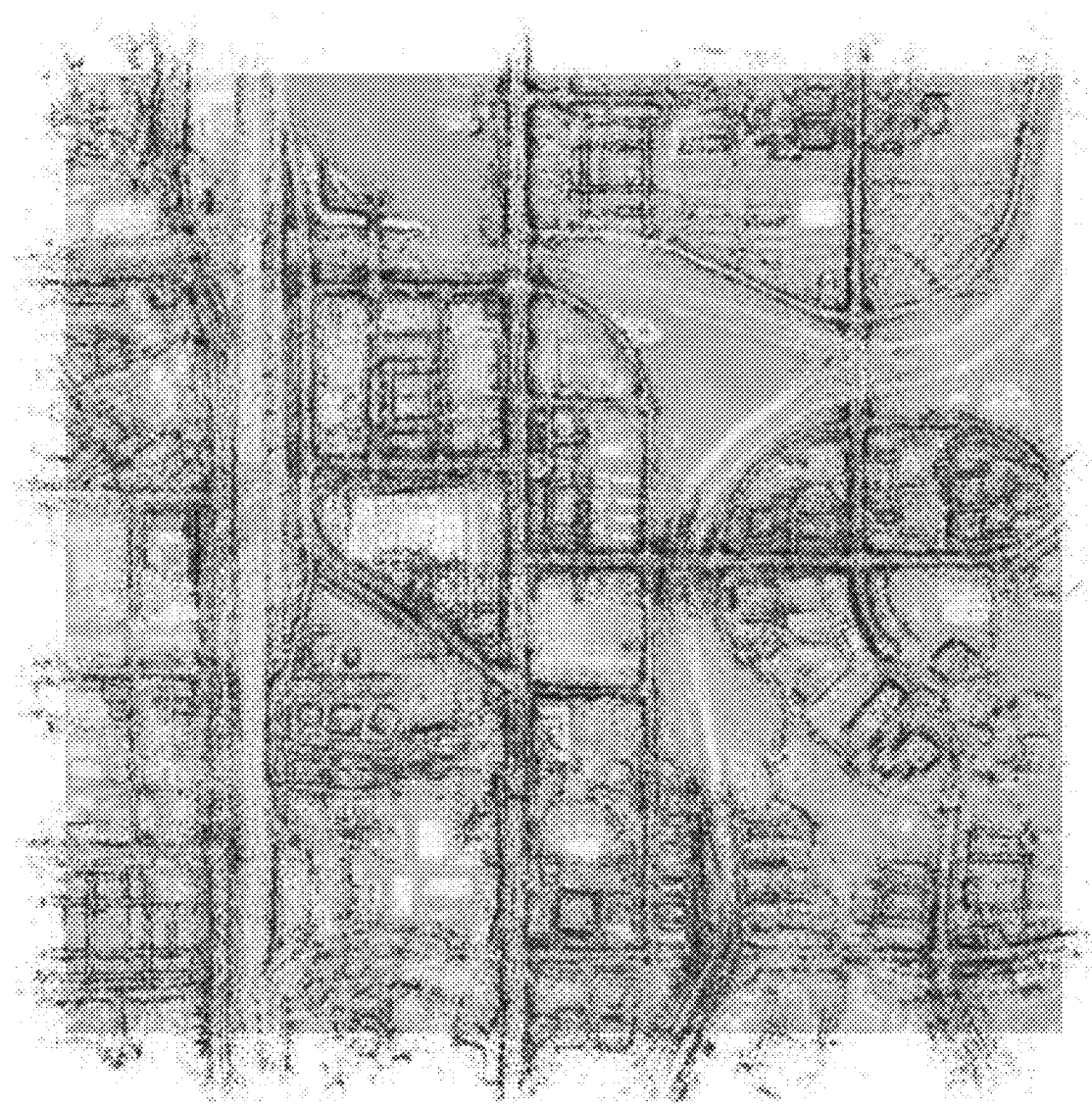

FIG. 3 is a flowchart for explaining processes to perform visual localization according to at least one example embodiment. FIG. 4 is a conceptual view for explaining map data established by the processes of FIG. 3. FIG. 5 shows pictures illustrating a feature point map based on a 3D model which is based on aerial photos, and a feature point map based on a street view image, respectively. And FIGS. 6A and 6B are conceptual views illustrating a mismatched example and a matched example, among coordinates of the data shown in FIG. 5, respectively.

Referring to FIG. 3, a visual localization method according to at least some example embodiments may include generating a first feature point map (S110), generating a second feature point map (S120), constructing map data for localization where the first feature point map and the second feature point map are integrated with each other (S130), and performing visual localization (S140).

The step of generating a first feature point map (S110) may be a step of generating a first feature point map by using first map data calculated based on a first viewpoint. And the step of generating a second feature point map (S120) may be a step of generating a second feature point map by using second map data calculated based on a second viewpoint different from the first viewpoint. In this case, the generating of the first feature point map (S110) and the generating of the second feature point map (S120) are not necessarily performed in a time-series manner, but may be simultaneously performed or the sequences (order) may be switched from each other.

Here, the first viewpoint may be one of a road viewpoint and an aerial viewpoint, and the second viewpoint may be another of the road viewpoint and the aerial viewpoint. Accordingly, the first map data may be one of a street view image and 3D model data, and the second map data may be another of the street view image and the 3D model data. Further, the first feature point map may be one of a feature point map generated based on the street view image and a feature point map generated based on the 3D model data, and the second feature point map may be another thereof.

According to at least one example embodiment, for convenience, it is explained that the first viewpoint is a road viewpoint and the second viewpoint is an aerial viewpoint. However, an opposite case is possible. Thus, the step of generating a first feature point map (S110) may be a step of generating a first feature point map based on a street view image captured at a road viewpoint. Also, the step of generating a second feature point map (S120) may be a step of generating a second feature point map from 3D model data which is based on an image of an outdoor space captured from the air.

In case of the second feature point map, since the feature point map is generated by using 3D model data of an aerial viewpoint, a viewpoint change is also possible. Since the second feature point map is a virtual 3D map, a map at a road viewpoint can be generated through image rendering using a position and a direction at the road viewpoint.

In case of the first and second feature point maps, there is a problem that a coordinate system of 3D points generated from a street view image is not consistent with that of 3D points constructed from an aerial photo-based 3D model. Due to errors of GPS and IMU sensors, there exists a pose difference between the two 3D points generated in different manners. Thus, as shown in FIG. 6A, the 3D points of the first feature point map are misaligned with the aerial photo of the second feature point map due to a sensor error, etc. even at the same area. Here, the first feature point map may be formed as the points are collected as data (refer to FIG. 5(a)), and the second feature point map may be formed based on an aerial photo (refer to FIG. 5(b)).

In order to solve such a problem, according to at least one example embodiment, the step of constructing map data for localization where the first feature point map and the second feature point map are integrated with each other (S130) may be a step of constructing map data for localization where the first feature point map and the second feature point map are integrated with each other, by using a difference of a camera pose with respect to the points of the first feature point map and the points of the second feature point map.

More specifically, map data for localization is constructed by integrating the first feature point map and the second feature point map with each other, and is utilized to visual localization on a sidewalk. For the integration of the first feature point map and the second feature point map, as shown in FIG. 4, a second feature point map 140 may be matched with a first feature point map 130, thereby constructing map data for localization 150.

By such a matching, as shown in FIG. 6B, the aerial photo of the second feature point map is consistent with the 3D points of the first feature point map.

Then, in the step of executing visual localization (S140), visual localization on the sidewalk is executed by using the map data for localization.

In the specification, for convenience, a data matching method and a visual localization execution process will be firstly explained with reference to FIGS. 7 to 11. Then, the step of generating a first feature point map (S110) will be explained later in more detail with reference to FIGS. 12A to 17B, and the step of generating a second feature point map (S120) will be explained later in more detail with reference to FIGS. 18A to 23.

For the data matching, many methods may be used. According to at least one example embodiment, data of the first feature point map and data of the second feature point map are made to be consistent with each other through local feature matching or scan matching.

Local Feature Matching

Figure 7:
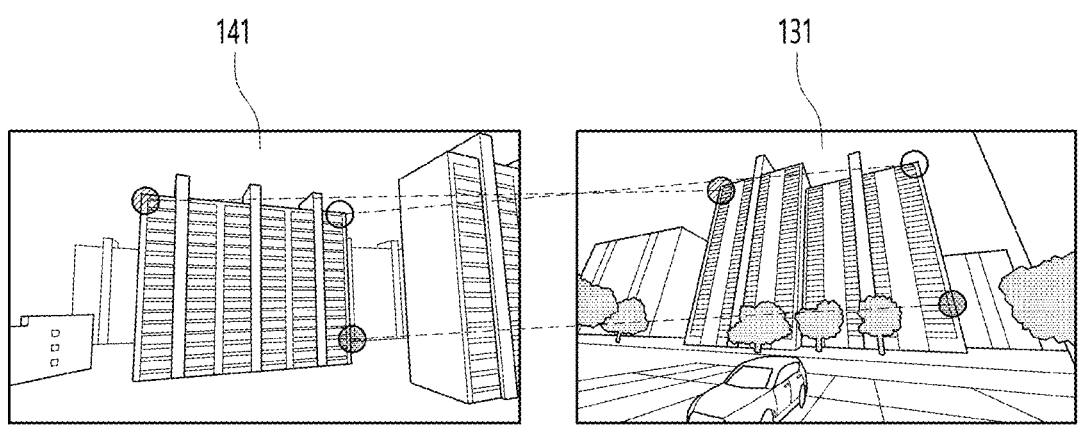
FIG. 7 is a conceptual view showing an embodiment to match a first feature point map and a second feature point map of FIG. 3 with each other.

FIG. 7 is a conceptual view showing an embodiment to match a first feature point map and a second feature point map of FIG. 3 with each other, which represents a concept of local feature matching more concretely.

In order to perform local feature matching, in the step of constructing map data for localization, correspondences of feature points are firstly calculated between an image 131 of the first feature point map and an image 141 of the second feature point map.

For instance, a feature point of an 2D image is extracted on the basis of an image rendered from an aerial photo-based 3D model, and a feature point is extracted from a street view image. Then, correspondences of the feature points are calculated.

The feature points are characteristic spots on an image, which may be spots including critical information of the image. For instance, the feature points may be corners of a building, etc.

In this case, the image 131 of the first feature point map may be provided with a street view image captured at a road viewpoint, and the image 141 of the second feature point map may be provided with an image rendered at the road viewpoint by using 3D model data on an outdoor space. For instance, as shown in FIG. 7, feature points are extracted from a street view image as the image 131 of the first feature point map, and feature points are extracted from an image rendered to the image 141 of the second feature point map.

In this case, the feature point extraction technique is not limited to a specific example, and various techniques applicable to at least some example embodiments may be considered. Thus, in this specification, there is no restriction thereon.

In this case, the street view image may be obtained from a tile map having a plurality of image tiles. The tile map provides map image tiles, and may be provided with a map including a map type such as a general map, a satellite map and a topographic map, and including detailed information such as public transportation, a bicycle road and real-time traffic information, as an image tile.

In this embodiment, the street view image is provided with a plurality of image tiles, and the plurality of image tiles may be matched with the rendered image. For this, feature point extraction from the image of the first feature point map is performed at the image tiles. And correspondences are calculated at feature points of the image tiles and feature points of the rendered image.

Next, a difference of the camera pose may be estimated by using the correspondences. For instance, a pose difference between one image tile and a 3D model is estimated by using the calculated correspondences, e.g., a PnP solver (a perspective-n-point solver).

The PnP solver may be a technique to estimate a camera pose (e.g., a position, an angle and a direction of a camera) by using a perspective-n-point algorithm.

More specifically, a camera pose corresponding to one of the first and second feature point maps is compensated on the basis of another, through error reduction or, alternatively, error optimization among the features points of the image of the first feature point map and the image of the second feature point map. In this embodiment, the error reduction or, alternatively, error optimization is performed with respect to a camera pose of the image tiles by matching the image tiles of the street view image with the rendered image of the 3D model. For instance, information such as the camera pose of the image tiles of the street view image may be updated based on the rendered image of the 3D model.

Through the aforementioned processes, information such as a camera pose may be consistent with each other on the same coordinates of the first and second feature point maps. Such information consistency may be implemented by compensating for information such as a camera pose before generating data of the first and second feature point maps, or by compensating for information after generating data of the first and second feature point maps.

Meanwhile, as a matching method of the first and second feature point maps, various types of techniques may be applied. As such an example, according to at least one example embodiment, the first feature point map and the second feature point map may be matched with each other by scan matching.

Scan-Matching

Figure 8:
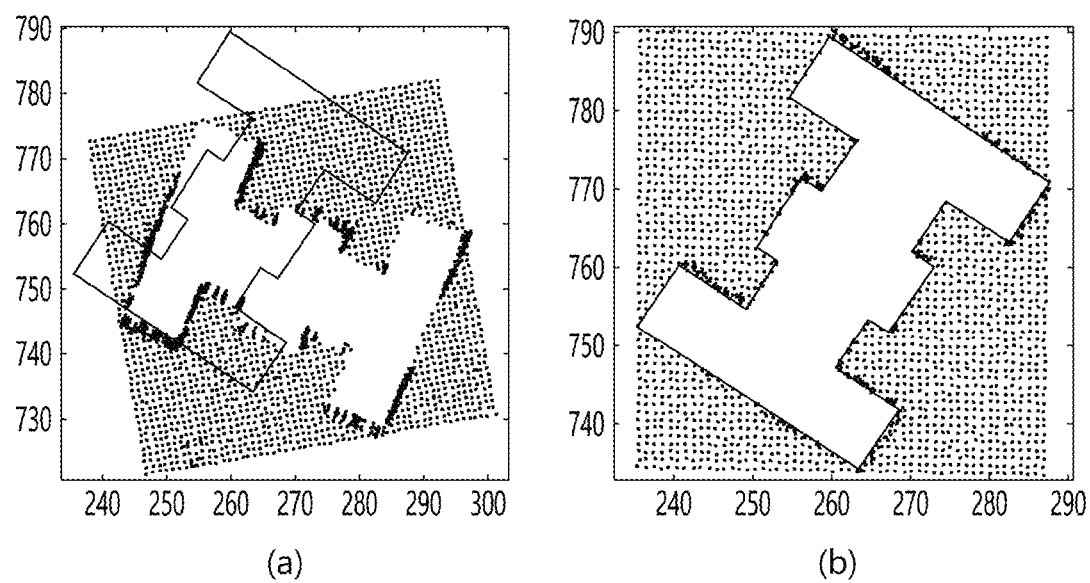
FIG. 8 is a conceptual view showing another embodiment to match the first feature point map and the second feature point map of FIG. 3 with each other.

FIG. 8 is a conceptual view showing another embodiment to match the first feature point map and the second feature point map of FIG. 3 with each other, which represents a concept of scan matching more concretely.

As shown in FIG. 8(a), before scan matching, data of the first feature point map is not consistent with data of the second feature point map. However, after scan matching for data matching, matched data may be implemented as shown in FIG. 8(b).

In this case, the first and second feature point maps undergo scan matching, thereby matching one of the first and second feature point maps with another.

As such an example, the 3D points of the first feature point map may be matched with the 3D model of the second feature point map through a comparison, by using an Iterative Closest Point (ICP) algorithm. In this case, as shown, a method to optimize a distance between a point and a point or a distance between a point and a line may be applied by using the ICP algorithm. In this case, an ICP method using a distance between a point and a surface (mesh), for instance may be applied by using another ICP algorithm.

Alternatively, the 3D model may be provided with meshes, and the second feature point map may be provided with mesh information. And may be used a matching method of the first and second feature point maps through a comparison between the 3D points of the first feature point map and the mesh information of the second feature point map.

The first feature point map may be provided with point information, and the second feature point map may be provided with 3D meshes of aerial data. And the matching may be performed through reduction or, alternatively, minimization of a distance between the point and the mesh. In this case, once the point information is updated based on the mesh, information such as the camera pose may be compensated.

Like this, upon construction of the map data for localization having the first and second feature point maps integrated with each other, visual localization is executed on the sidewalk by using the map data for localization in S140.

Figure 9:
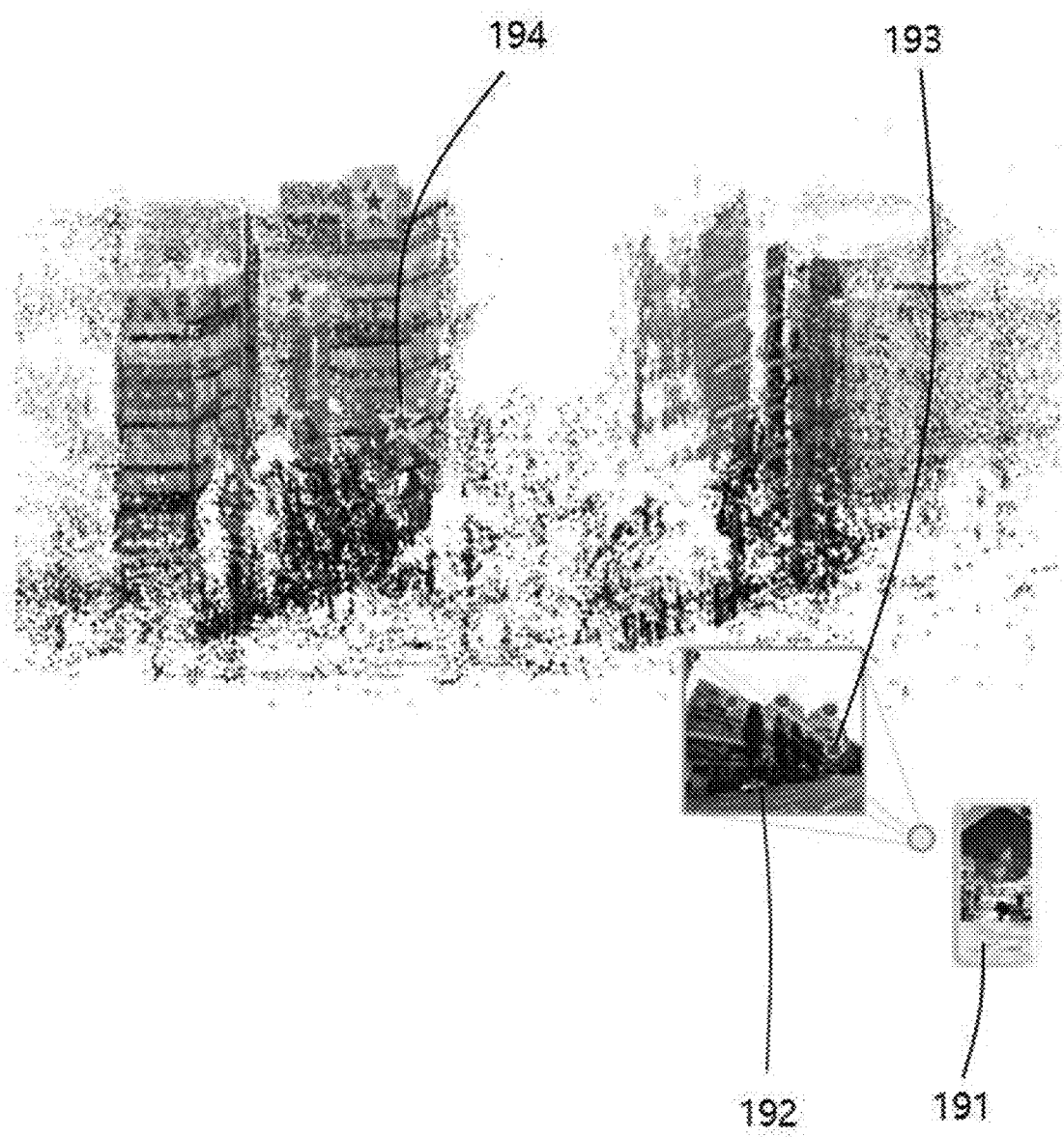
FIG. 9 is a conceptual view showing an example to perform visual localization on a sidewalk by using data of FIG. 4.
Figure 10:
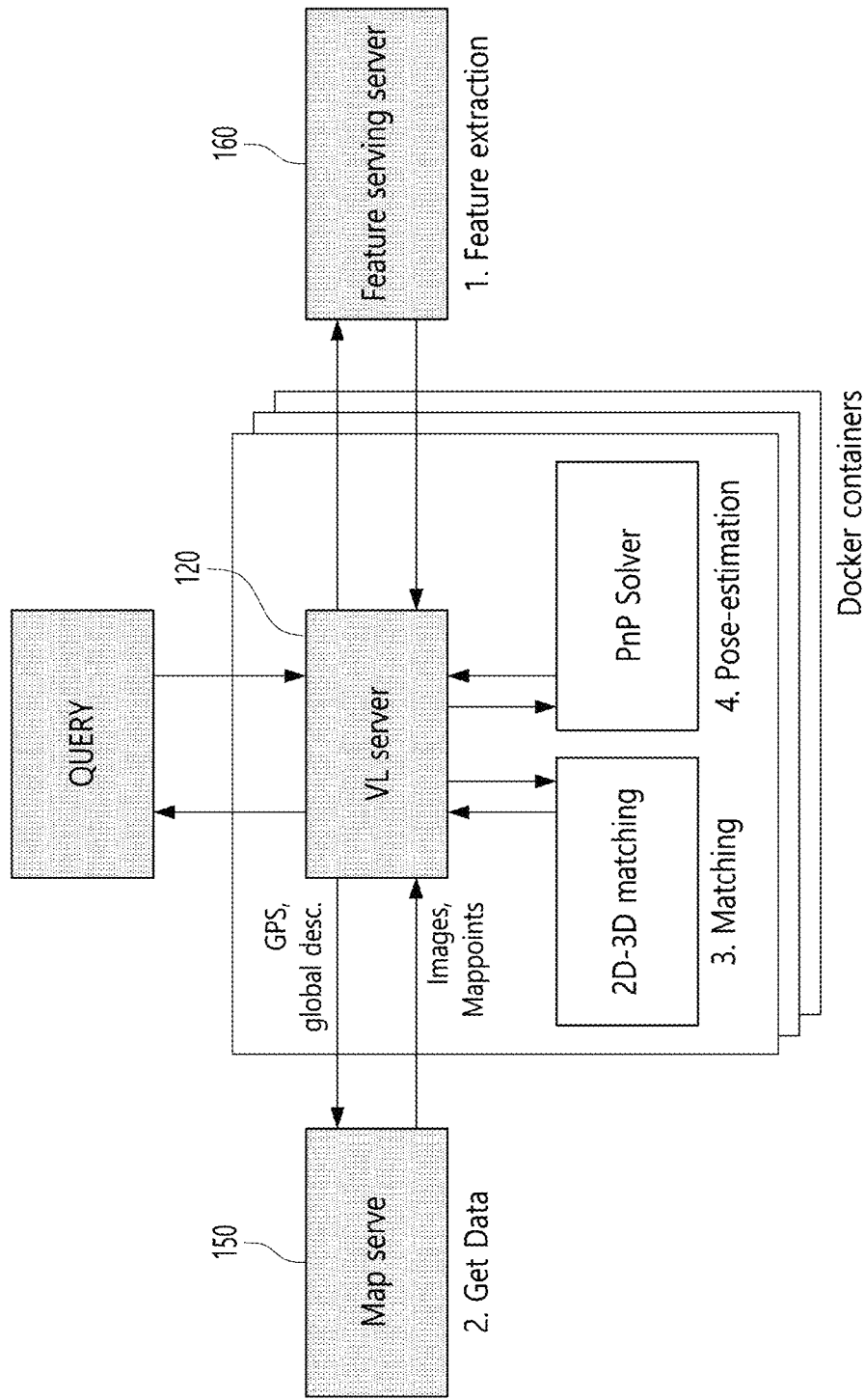
FIG. 10 is a block diagram showing a data structure of visual localization.
Figure 11:
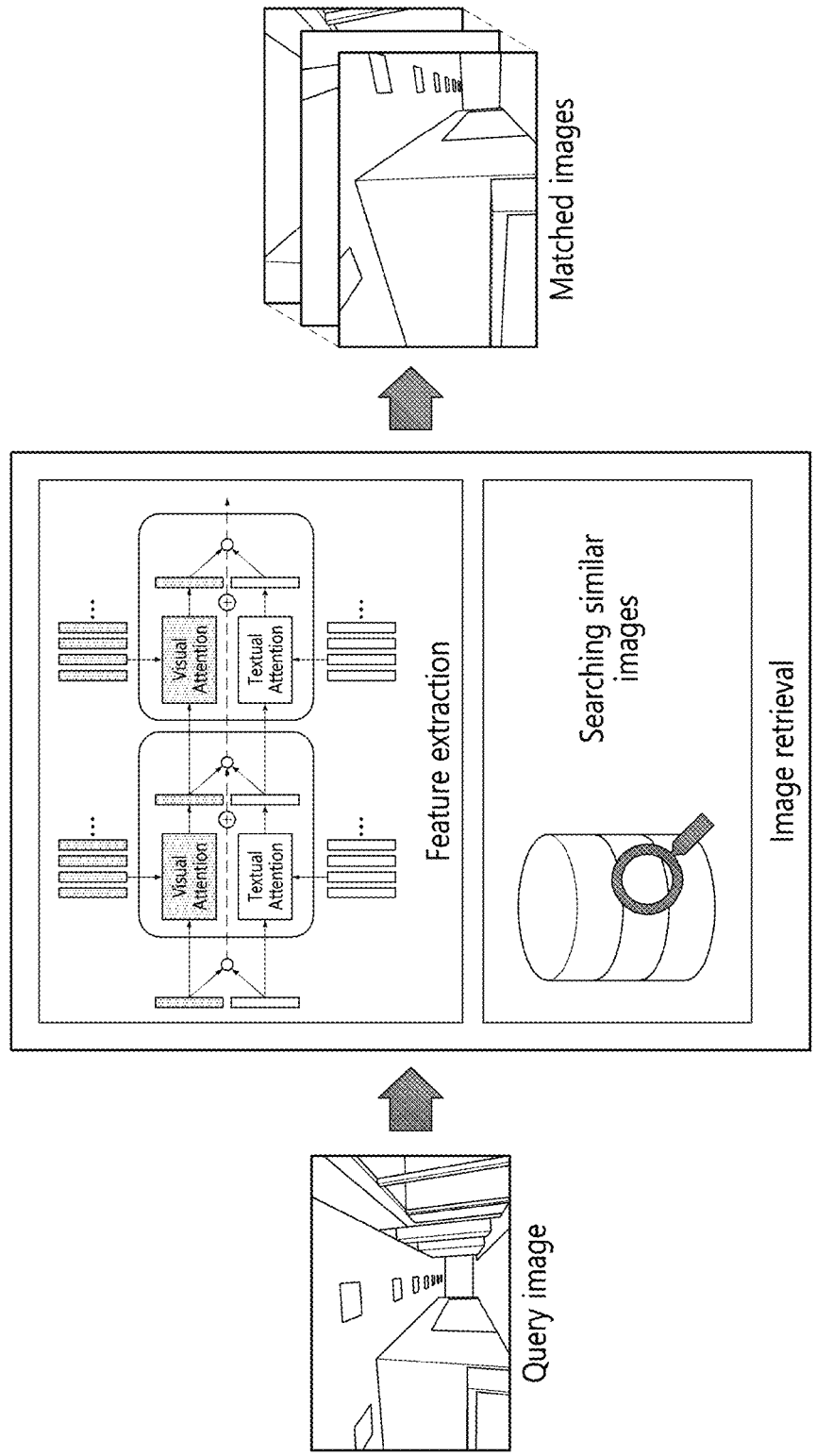
FIG. 11 is a conceptual view showing a concept for determining a similarity among images by using a global descriptor in FIG. 10.

FIG. 9 is a conceptual view showing an example to perform visual localization on a sidewalk by using data of FIG. 4. FIG. 10 is a block diagram showing a data structure of visual localization. And FIG. 11 is a conceptual view showing a concept for determining a similarity among images by using a global descriptor in FIG. 10.

It is possible to estimate a 3D position and a pose of a user who moves on foot with just a sheet of image, by utilizing the aforementioned map data for localization. For instance, the user may check a self-position by using a mobile device, or may be provided with a service based on a self-position.

In this case, the step of executing visual localization may include extracting a feature point by receiving an input image, extracting a reference image having data similar to the feature point of the input image from the map data for localization, and estimating a pose by using the reference image.

Referring to FIG. 9, a visual localization service may be performed at a user's mobile device as an example of the position service.

A user may execute an application related to the visual localization service on a smart phone 191 in order to check a self-position at a specific spot while moving on foot, and may capture nearby streets. The application estimates a 3D position and a pose of the mobile device by comparing a feature point 193 of a captured input image 192 with a feature point 194 of the map data for localization.

In order to perform such processes, as shown in FIG. 10, the visual localization system may include integrated map data for localization 150, a VL server 120, and a deepfeature serving server 160. Hereinafter, processes of visual localization will be explained in more detail.

As shown in FIGS. 10 and 11, if an input image is input as a query, the VL server 120 and the deepfeature serving server 160 extract reference image data similar to the input image, from the integrated map data for localization 150, by using GPS information and a global descriptor. Here, the VL server 120 transmits an image to the deepfeature serving server 160, and the deepfeature serving server 160 may extract a global descriptor, a local descriptor and a local feature point. The VL server 120 extracts reference image data similar to the input image, from the integrated map data for localization 150, by using the extracted global descriptor and GPS information.

The global descriptor may be a float vector of 1×N describing one sheet of image which is utilized. A similarity between images may be determined by using the global descriptor, e.g., a cosine similarity, etc.

Next, a camera position and a camera pose are estimated through local feature matching. For instance, local feature matching between an input image and a similar reference image is performed by using the extracted local descriptor and local feature point. Then, a camera position and a camera pose may be estimated through an obtained correlation. The local feature matching may be matching between 2D information and 3D information.

For instance, as shown in FIG. 9, if information of the first feature point map is more similar to a query image captured by a mobile device, matching may be performed between a feature point of 3D data of the first feature point map generated from the map data for localization based on a street view, and a feature point of a 2D image captured by the mobile device.

More specifically, the deepfeature serving server 160 extracts a local feature point, and a 3D value of the first feature point map matching with the feature point of the 2D image is detected through 2D-3D matching, by using a local feature descriptor. Then, the PnP solver performs an operation based on the 3D value and a pixel value of the 2D input image, thereby estimating a camera pose.

The operation by the PnP solver is performed to obtain correspondences between 2D pixel coordinates and 3D points on the map through local feature matching, and to calculate a pose of the input image through plural pairs of 2D-3D information. Since a plurality of feature points are detected and the feature points are connected to 3D information, a plurality of 2D-3D information may be obtained and thereby a pose of the input image may be calculated.

In this case, the pose may be estimated through repetitive operations to reduce or, alternatively, minimize a re-projection error. The re-projection error may be defined as a pixel error between 2D feature points of an input image when 3D points on the map are projected onto the input image.

As aforementioned, according to at least one example embodiment, a precise position of the mobile device may be measured by using an estimated pose and a 3D position calculated through matching between an input image and a similar image. In this case, many services based on the position may be executed on the smart phone.

Hereinafter, the aforementioned step of generating a first feature point map (S110) and step of generating a second feature point map (S120) will be explained in more detail.

Figure 12A:
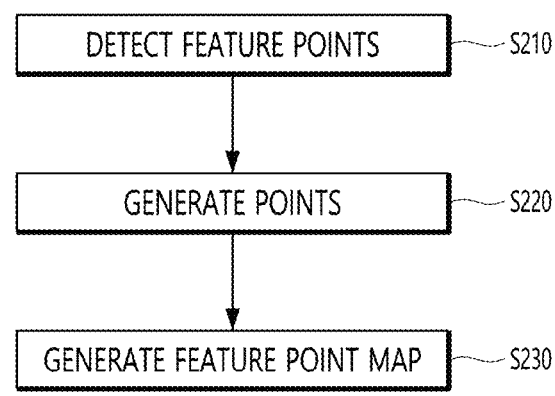
FIG. 12A is a flowchart for explaining a method of generating a first feature point map according to at least one example embodiment.
Figure 12B:
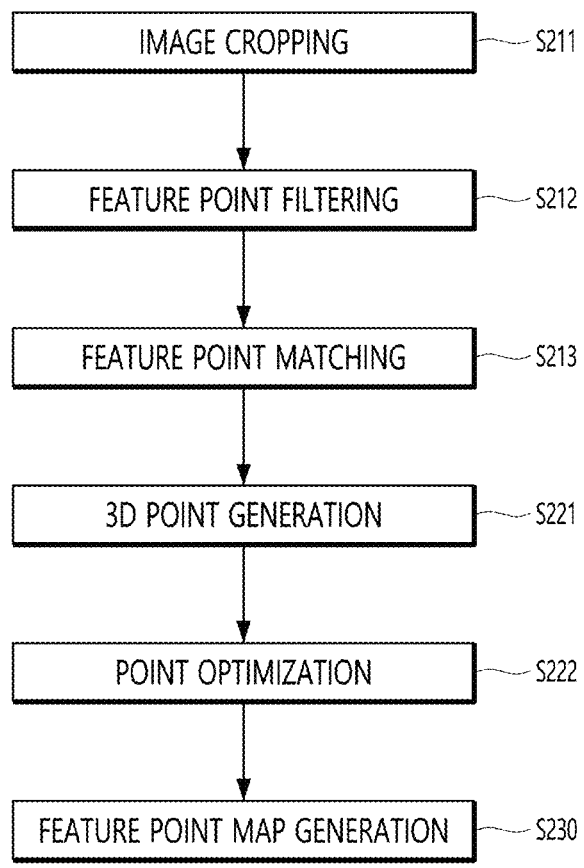
FIG. 12B is a detailed flowchart showing an embodiment of the flowchart of FIG. 12A.

FIG. 12A is a flowchart for explaining a method of generating a first feature point map according to at least one example embodiment, and FIG. 12B is a detailed flowchart showing an embodiment of the flowchart of FIG. 12A.

Referring to FIG. 12A, the step of generating a first feature point map may include a feature point detection step (S210), a point generation step (S220), and a feature point map generation step (S230).

Firstly, in the feature point detection step (S210), feature points are detected from street view images captured at a road viewpoint.

For instance, a feature point of an object may be detected from each of the street view images. The object includes a road, a tree, a person, a car, the sky, a building, etc., and may be at least one of all objects inside the street view image.

For this, referring to FIG. 12B, the feature point detection step (S210) may be subdivided into a first step (S211), a second step (S212) and a third step (S213).

The first step (S211) is a step of cropping an image, in which a street view image is cropped into a plurality of images.

The cropping means cutting a part of a captured image. More specifically, the cropping has a similar meaning to trimming, which may mean cutting an unnecessary part of an image, or cutting a picture into a plurality of images according to a preset criteria through segmentations.

The second step (S212) is a step of filtering feature points, which may be a step of setting an unnecessary object in an image before feature point matching, more specifically. The third step (S213) is a step of matching feature points, which may be a step of matching feature points at the remaining objects except for the unnecessary object.

According to at least one example embodiment, the feature point matching through exclusion of unnecessary objects does not necessarily mean removal of all feature points. Rather, the feature point filtering should be interpreted as reduction of the number of feature points corresponding to unnecessary objects as much as possible. Further, the second step (S212) and the third step (S213) are not necessarily performed in a time-series manner. For instance, the second step (S212) and the third step (S213) may be simultaneously performed or the sequences (order) may be switched from each other.

Like this, in the feature point detection step (S210), a street view image is cropped, feature point filtering is performed, and feature point matching may be performed among the cropped images.

Then, in the point generation step (S220), points are generated to generate a feature point map. More specifically, the point generation step (S220) may be provided with a fourth step (S221) and a fifth step (S222).

The fourth step (S221) may be a step of generating 3D points related to the street view image on the basis of matching among the feature points. The generated 3D points undergo point optimization of the fifth step (S222). Through this, a feature point map may be generated (S230). Here, the fifth step (S222) may be a step of compensating the 3D points through optimization in order to generate the feature point map.

As aforementioned, the method of generating a first feature point map based on images may be provided with the first to fifth steps. However, at least some example embodiments are not limited to this. For instance, a part of the respective steps of the method of generating a first feature point map may be excluded. As such an example, the first feature point map may be generated by excluding the first step (S211) of cropping an image.

Hereinafter, the respective steps of the method of generating a first feature point map will be explained in more detail with reference to the drawings.

Figure 13:
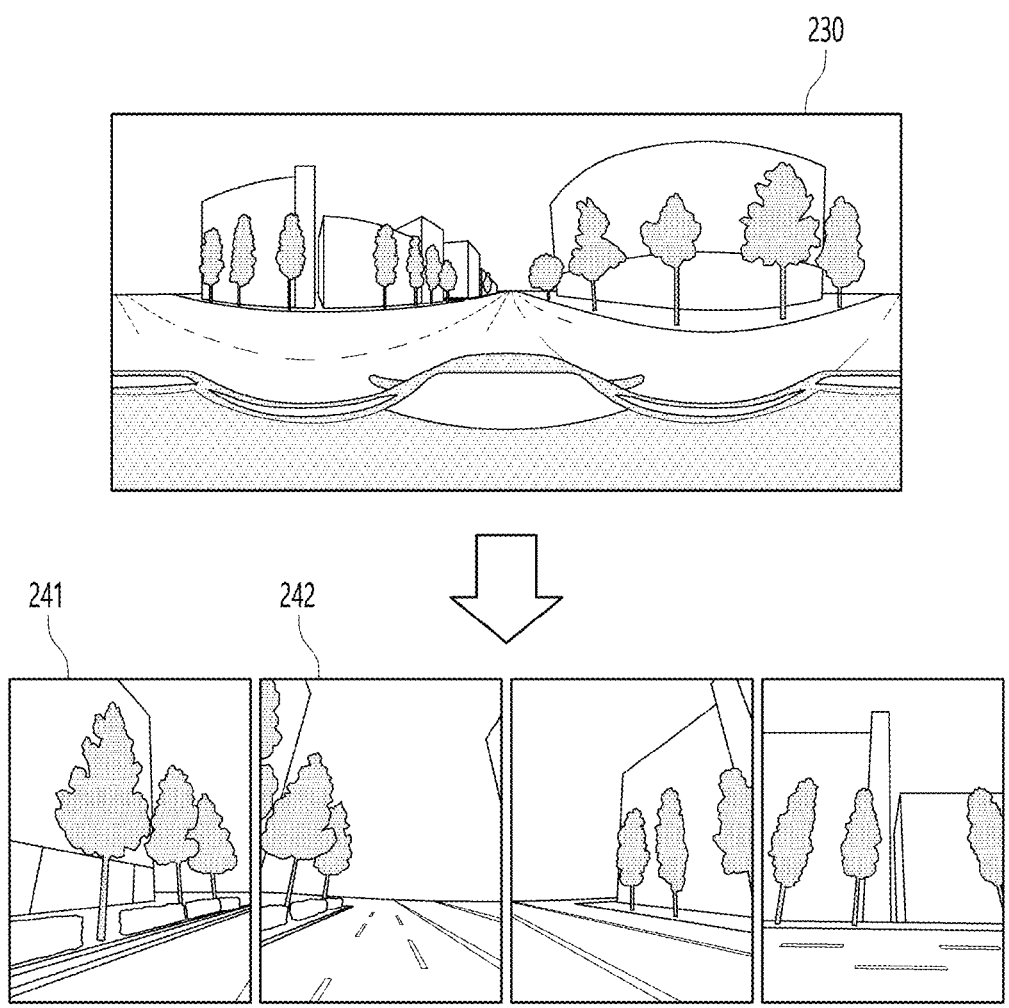
FIG. 13 is a conceptual view for explaining a first step of FIG. 12B.
Figure 14A:
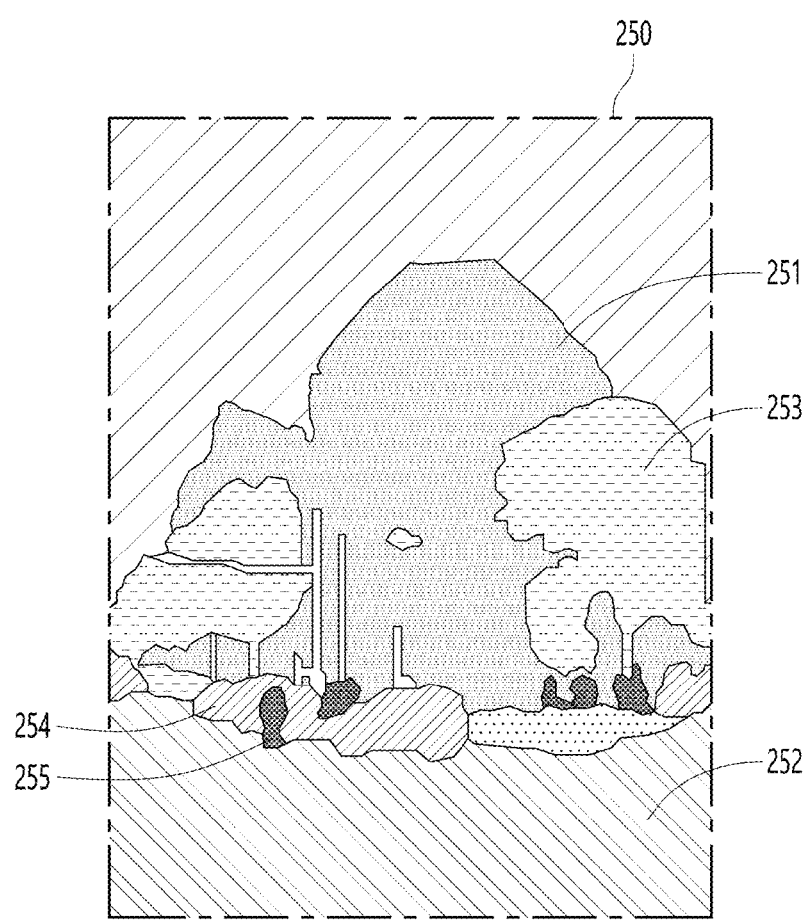
FIGS. 14A and 14B are conceptual views for explaining a second step of FIG. 12B.
Figure 14B:
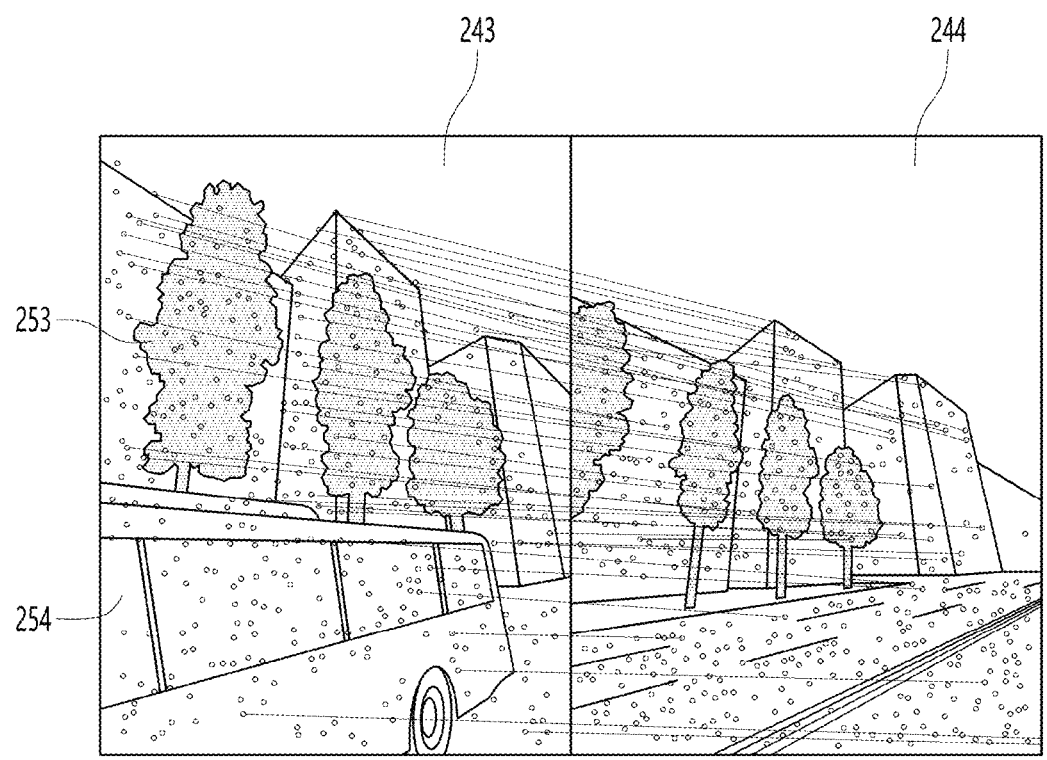
Figure 15A:
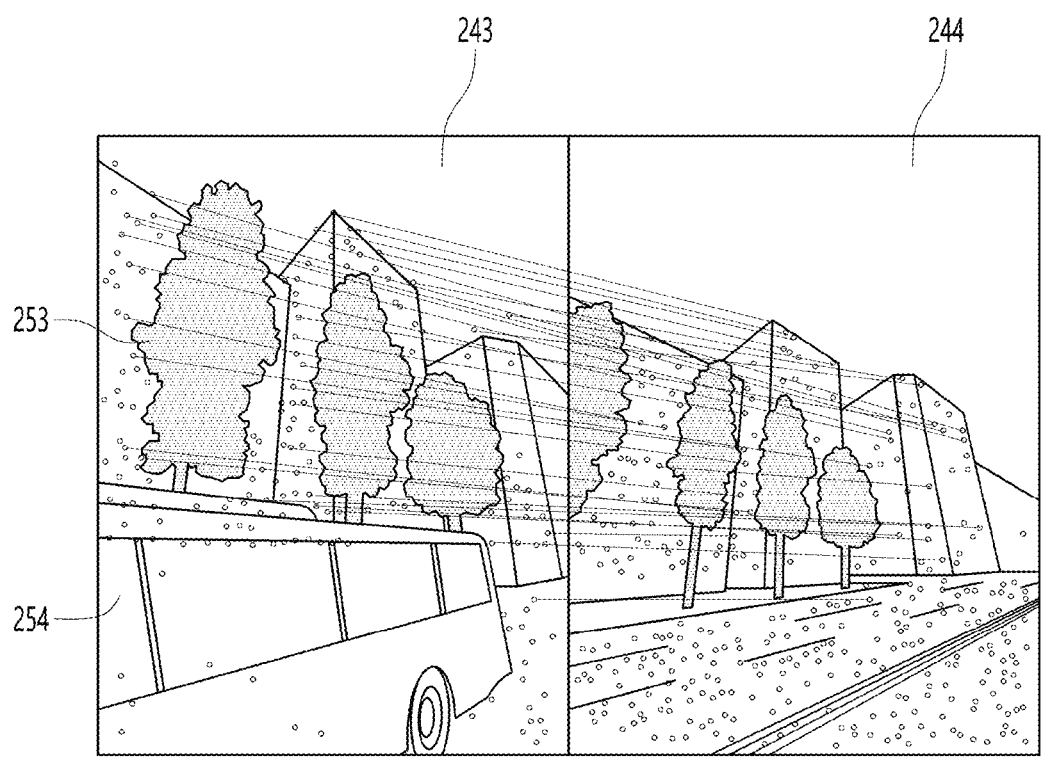
FIGS. 15A and 15B are conceptual views for explaining a third step of FIG. 12B.
Figure 15B:
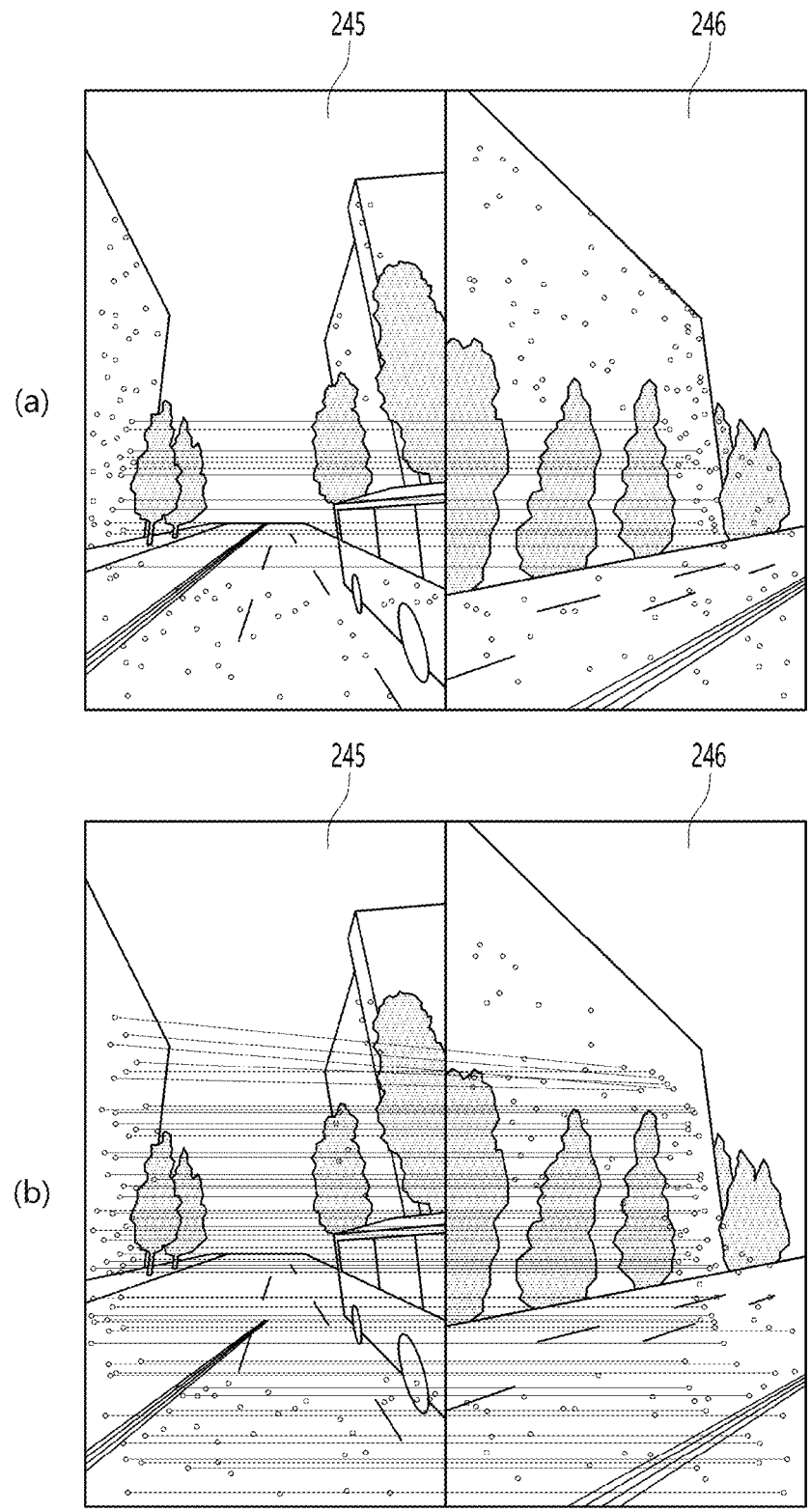
Figure 16A:
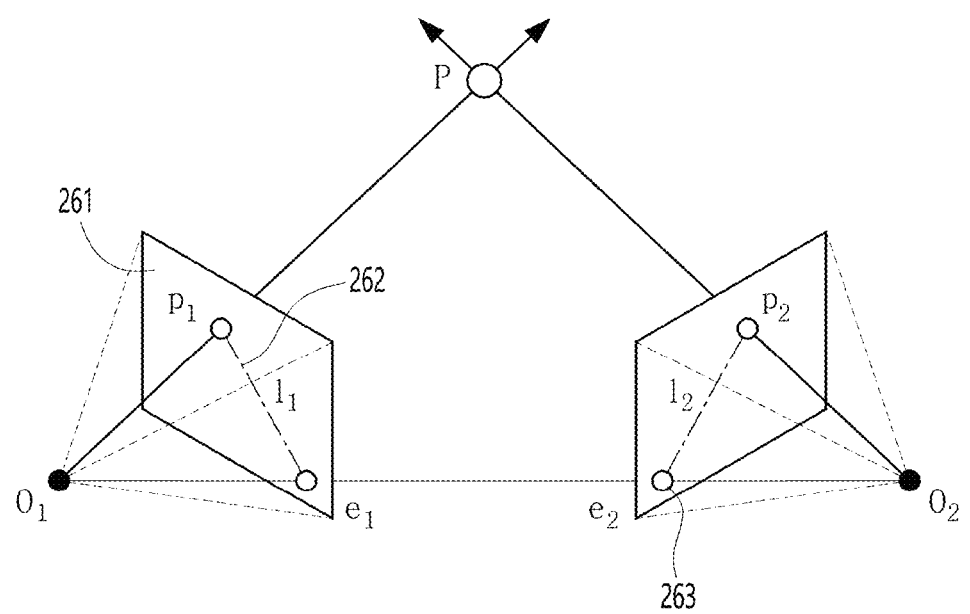
FIGS. 16A and 16B are conceptual views for explaining a fourth step of FIG. 12B.
Figure 16B:
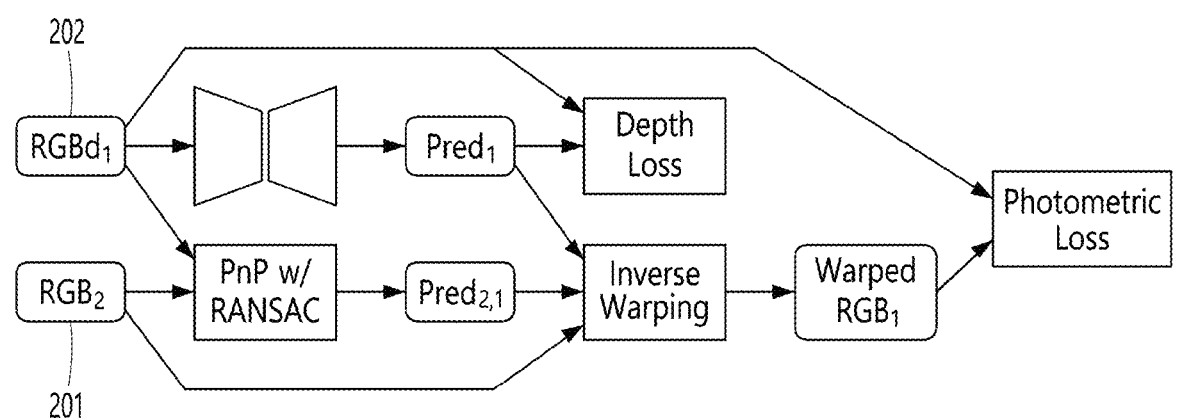
Figure 17A:
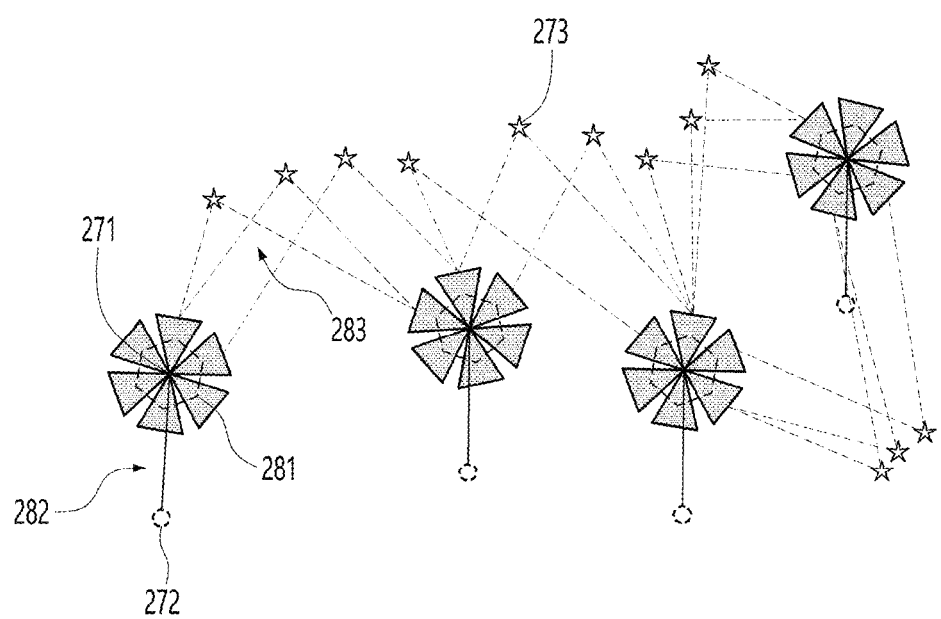
FIGS. 17A and 17B are conceptual views for explaining a fifth step of FIG. 12B.
Figure 17B:
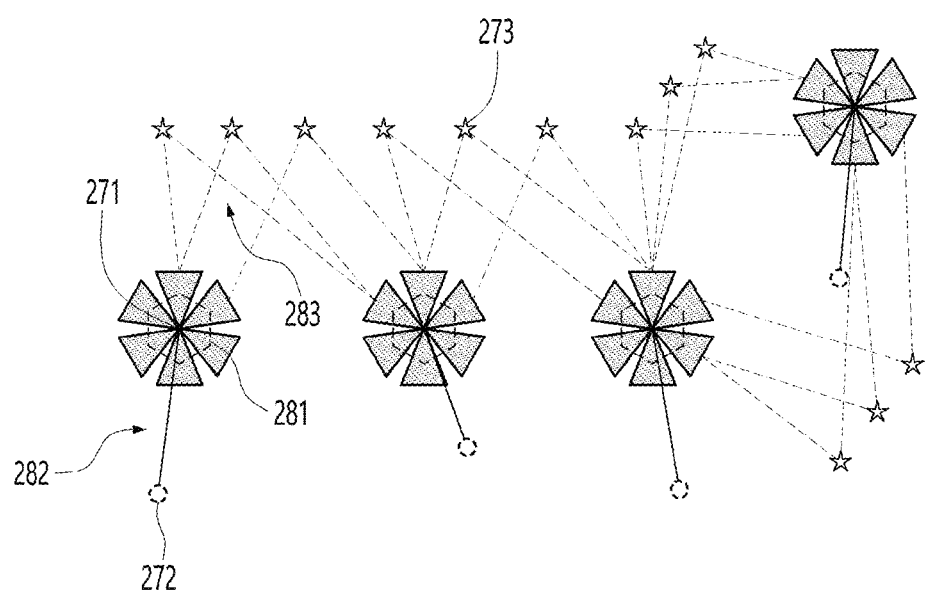

FIG. 13 is a conceptual view for explaining the first step of FIG. 12B. FIGS. 14A and 14B are conceptual views for explaining the second step of FIG. 12B. FIGS. 15A and 15B are conceptual views for explaining the third step of FIG. 12B. FIGS. 16A and 16B are conceptual views for explaining the fourth step of FIG. 12B. And FIGS. 17A and 17B are conceptual views for explaining the fifth step of FIG. 12B.

Firstly, the step of cropping a street view image will be explained with reference to FIG. 13.

In the first step (S211), a street view image 230 is cropped to be divided into at least one image. The image division may include cutting a single image of the street view image 230, or dividing the street view image into a plurality of images.

For instance, the street view image 230 may be provided with a spherical panoramic image, and the spherical panoramic image may be cropped into a plurality of images 241, 242.

The spherical panoramic image is an image of 360 degrees, and cropping is performed for a plurality of images viewed at specific angles. For instance, the cropping may be performed by dividing the spherical panoramic image into a plurality of directions based on the north.

Since the street view image 230 is cropped, a plurality of images 241, 242 having a different size from the street view image 230 are generated. In this case, the cropped plurality of images 241, 242 may be images having a vertical length longer than a horizontal length. For instance, the street view image 230 may be cropped to an image which is long in a vertical direction, like a display of a smartphone. In order to capture an image and to utilize for visual localization on the smartphone, the cropped plurality of images 241, 242 may have a similar shape to the captured image. Like this, the cropped plurality of images 241, 242 may be formed to be long in a vertical direction, and may be utilized as information compared with an image captured by the smartphone.

Further, the cropped plurality of images 241, 242 may include graphic objects of the same object with different viewpoints. That is, the graphic objects in the cropped plurality of images 241, 242 may have shapes partially overlapped with each other or viewed from different angles.

Meanwhile, a specific area of the street view image 230 may be excluded from the plurality of images by the cropping. As such an example, as shown, the street view image 230 may include a part of a vehicle which captures the street. The corresponding area is unnecessary in generating a feature point map, and may be excluded by the cropping.

Next, the feature point detection step may be performed with respect to the cropped plurality of images. Here, the second step of filtering feature point matching (S222) may be firstly performed.

Referring to FIG. 14A, in the second step (S222), the objects are segmented in the street view image in unit of meaning, and feature points corresponding to at least a part of the objects are filtered. The feature point filtering may be performed by segmenting the street view image into an unnecessary area and a necessary area, and by removing feature points corresponding to the unnecessary area. As such an example, unnecessary feature points may be removed through semantic segmentation-based matching filtering.

Referring to FIG. 14B, it can be seen that many feature points are generated by trees 253 and a vehicle 254 between a first image 243 and a second image 244. If unnecessary matching occurs at regions of a road, a tree, a person and a vehicle inside an image, visual localization may have a lowered performance and accuracy of mapping may be lowered. To prevent this, pixels of a cropped image 250 are classified into a preset number of classes, and label prediction of all the pixels is performed. Through such label prediction of all the pixels, segmentation may be performed.

A building 251 inside the cropped image 250 may be labeled as a first class of a necessary area, and a road 252, a tree 253, a vehicle 254 and a person 255 may be labeled as a second class of an unnecessary area.

In conclusion, objects which dynamically move or which vary according to the season, such as a road, a tree, a person and a vehicle inside the cropped image 250, may undergo semantic-segment filtering, thereby having feature points removed therefrom.

Through such semantic-segment filtering, subsequent feature point matching may be performed more precisely. FIG. 15A shows a result of filtering through the second step (S222) and feature point matching through the third step (S223). As shown, it can be seen that feature point matching is performed more precisely as feature points have been removed from the trees 253 and the vehicle 254 of the first image 243 and the second image 244.

In this case, in the third step (S223), feature point matching is performed among a plurality of cropped images which are within a specific range. For instance, a radius is set by using GPS information of the street view image, and feature point matching is performed by gathering cropped images within the set radius. More specifically, as shown in FIG. 15B, if a range to represent a specific building is shown in an image, feature point matching may be performed between an image representing one end of the building and an image representing most of the building.

Also, the feature point matching may be performed by calculating homography between at least one pair of images among the street view image, and by using the homography within a preset specific range. Like this, according to at least one example embodiment, homography is used differently from putative matching for comparing entire feature points between two images. This allows feature point matching of a high density to be performed within a preset specific range.

FIG. 15B(a) shows a result of putative matching, and FIG. 15B(b) shows a result of guided matching by homography. As shown, it can be seen that feature point matching of a high density is possible as homography between two images is calculated to be used at the time of performing matching.

More specifically, a transform of homography between two images is calculated by putative matching for matching entire feature points of two images one by one. Then, feature points are matched within pixels of a preset range. More specifically, a corresponding pixel is searched by using the transform, and then a radius is set. Then, matching is performed with respect to feature points within the radius. As such an example, a position of a second image is detected with respect to any pixel within a first image on the basis of a point. On the basis of the position, feature point matching is performed by using the homography within a radius of 10-20 pixels.

Then, the feature point matching is performed while the position is moved through the entire images. By such guide matching, feature point matching having a higher density may be performed.

Next, in the fourth step (S221), a 3D point is generated by using a matching result.

The 3D point is generated as the same point as a substantial scale, by using GPS position information and a vehicle angle at the time of obtaining the street view image. As such an example, the point may be generated by a triangulation method.

Referring to FIG. 16A, a pose is calculated with respect to a sheet of image by using GPS position information and a vehicle angle. Here, the vehicle angle may be obtained from information about an inertial measurement unit (IMU). Then, a 3D point (P) with respect to the same feature point obtained between two images 261, 263 is calculated by using the pose.

For instance, considering an Epipolar Geometry at the first image 261 and the second image 263, a correlation shown in FIG. 16A is formed among a 3D point (P) that we can see with the eyes, a first image 261 captured at a first center point (O1), a point (P1) projected onto the first image 261, a second image 263 captured at a second center point (O2), a point (P2) projected onto the second image 263.

Epipoles (e1, e2) are formed at intersections between a line connecting the first center point (O1) to the second center point (O2) and the images 261, 263. The epipoles (e1, e2) and the projected points (P1, P2) are positioned on epipolar lines 262. If such a relation is used, a 3D point (P) may be generated from two images, and the 3D point is arranged on an absolute GPS position.

In this case, the 3D point may be generated in a different manner with respect to matched feature points between the street view images, and failed feature points. The matched feature points generate a 3D point by the aforementioned triangulation method, and the failed feature points generate a 3D point by a depth completion method.

For instance, as shown in FIG. 16B, a dense depth image is estimated by using a color image and a sparse depth image. More specifically, if a 3D point generated by triangulation is projected onto an image and the projected image and an RGB color image are input to a neural network, a sparse depth image may be output through learning.

Then, a dense depth image is estimated by using the color image and the sparse depth image. And a 3D point corresponding to the failed feature points is extracted by using the estimated depth image.

Once a 3D point is generated by such a method, the 3D point is optimized by the fifth step (S222). Then, a feature point map is generated by using the optimized 3D point (S230). Here, the feature point map may be generated by compensating for a pose of the street view images and a position of the 3D point, through a graph structure using nodes and edges.

For optimization of the 3D point, the nodes may be set as the pose of the street view images and the position of the 3D point, and the edges may be set as a plurality of errors related to the nodes.

More specifically, a 3D point may be erroneously reconstructed due to incorrect GPS information or an error of an IMU. Especially, characteristic information of the street view image obtained from an image viewed from a vehicle which drives on a road may be incorrect information. As such an example, the characteristic information includes GPS position information and information on a vehicle angle at the time of obtaining the street view image, and the GPS position information and the information on the vehicle angle may have errors.

Thus, a feature point map is generated by compensating for the pose of the street view image and the reconstructed 3D point, through graph-based optimization.

For instance, referring to FIG. 17A, the nodes may be provided with a cropped street view's pose node 271, and a GPS and IMU's pose node 272. In this case, an edge may be provided with a pose error 281 between cropped street views having high reliability, and a GPS and IMU's prior pose error 282 obtained at the time of acquiring the street view image and having low reliability.

The edge may be further provided with a projection error 283 between a 3D point 273 reconstructed by triangulation and a street view image. Here, the projection error 283 means an error between a pixel coordinate obtained by projecting a 3D point onto a cropped image plane, and a pixel coordinate of a feature point corresponding to each cropped image. The edge may be a binary factor defining a relation between the nodes 271, 272.

In this case, optimization is performed with respect to the errors 281, 282, 283 by using an error reduction or, alternatively, error optimization method. As a result, as shown in FIG. 17B, the street view pose and the 3D point may be compensated.

As aforementioned, a 3D point extracted by using a street view image may be erroneously estimated due to incorrect GPS information of the street view image. Due to such an erroneously-estimated 3D point, a plurality of errors occur. In this case, the 3D point and even GPS errors may be compensated through reduction or, alternatively, minimization of the errors.

According to at least one example embodiment, a feature point map is generated on the basis of a street view image, and visual localization on a sidewalk may be performed by using the feature point map. In this case, since the street view image is an image obtained at a road viewpoint, accuracy of a 3D point may be reduced at the time of converting the road viewpoint into a sidewalk viewpoint. Thus, according to at least one example embodiment, a street view pose and a 3D point are reconstructed for higher accuracy through the error reduction or, alternatively, error optimization. This may implement a map for visual localization at a sidewalk viewpoint.

In this case, the error reduction or, alternatively, error optimization is not limited to a specific example, and various techniques applicable to at least some example embodiments may be considered. Thus, in this specification, there is no restriction thereon.

As a result, a 3D point before optimization may have high accuracy like a 3D point after optimization.

The aforementioned 3D map can be used independently, as well as it is used for visual localization as a first feature point map as a part of integrated map data. For instance, it is possible to estimate a 3D position and a pose of a user who moves on foot with just a sheet of image, by utilizing the first feature point map.

So far, the method of generating a first feature point map has been explained. Hereinafter, a method of generating a second feature point map will be explained in more detail.

Figure 18A:
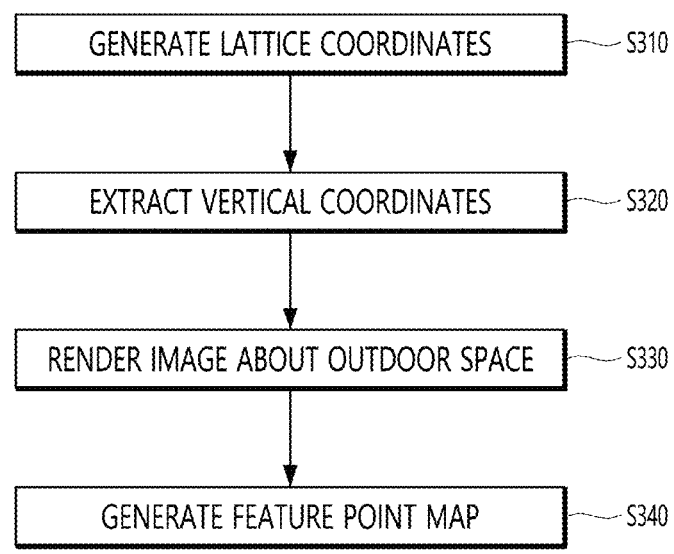
FIG. 18A is a flowchart for explaining a method of generating a second feature point map according to at least one example embodiment.

Referring to FIG. 18A, the method of generating a second feature point map according to at least one example embodiment may include generating lattice coordinates (S310), extracting vertical coordinates (S320), rendering an image of an outdoor space (S330), and generating a feature point map (S340)

In the generating of lattice coordinates (S310), lattice coordinates are generated along a sidewalk positioned around a roadway by using 2D map data of an outdoor space.

The lattice coordinates mean a coordinate system of a lattice shape where lengths and widths have a constant interval therebetween. In this case, the lattice coordinates may include coordinates of the sidewalk.

Next, in the step of extracting vertical coordinates (S320), vertical coordinates corresponding to the lattice coordinates are extracted from 3D model data which is based on an image of the outdoor space captured from the air. The vertical coordinates may be coordinates in a direction perpendicular to a ground surface, and may be extracted in correspondence to the lattice coordinates.

Then, in the step of rendering an image of an outdoor space (S330), a virtual camera pose is specified based on 3D coordinates defined by the lattice coordinates and the vertical coordinates, and the image of the outdoor space viewed from the virtual camera is rendered by using the virtual camera pose and the 3D model data.

The virtual camera pose may be a camera pose which captures an arbitrary point inside the outdoor space. Thus, the virtual camera pose may be specified based on an arbitrary space within the 3D modeling. In this case, the virtual camera may be positioned in an empty space not overlapped with an object (a building, etc.) within the 3D modeling. Further, a coordinate value on the sidewalk may be defined by using the 3D coordinates. Here, since the coordinate value on the sidewalk is defined by the 3D coordinates, a camera pose on the sidewalk may be specified. Further, the image of the outdoor space viewed from the sidewalk may be rendered if the specified camera pose and the 3D model data are used. Like this, the camera pose is specified on the sidewalk on the basis of the sidewalk. This may enhance a precision degree of a map utilized when visual localization is performed on the sidewalk. Ideally, visual localization can be correctly performed even if a query image is introduced at any pose, regardless of a camera pose. However, considering a calculation error, etc., accuracy is the highest when an image pose for a map generation is consistent with a query image pose for localization. Thus, according to at least one example embodiment, a 3D coordinate system including a coordinate value is utilized to check coordinates of the sidewalk.

Further, the camera pose may include coordinates representing a positon, and a posture representing an orientation. In this case, the coordinates may be specified as coordinates obtained by adding a desired or, alternatively, predetermined height, e.g., a robot's height or a person's eye level, etc. to the coordinates of the sidewalk. Further, the posture may be arbitrarily specified. However, the posture may be specified similarly to a corresponding posture under an assumption that a robot or a person substantially transmits a query image. For instance, the posture may be specified on the basis of a direction parallel to the ground surface, a direction to face a building, a user's walking direction, etc.

Next, in the step of generating a feature point map (S340), a feature point map at a sidewalk viewpoint is generated by using the rendered image and the virtual camera pose.

As aforementioned, in the method of generating a second feature point map according to at least one example embodiment, a feature point map is generated by using 2D map data and 3D model data. However, at least some example embodiments are not limited to this. For instance, it is possible to exclude a part of the steps of the method of generating a second feature point map. For instance, in a case that ground surface coordinate data on the sidewalk is included in the 3D model data, the feature point map may be generated by excluding the step of generating lattice coordinates (S310).

Hereinafter, each step of the method of generating a second feature point map will be explained in more detail with examples.

Figure 18B:
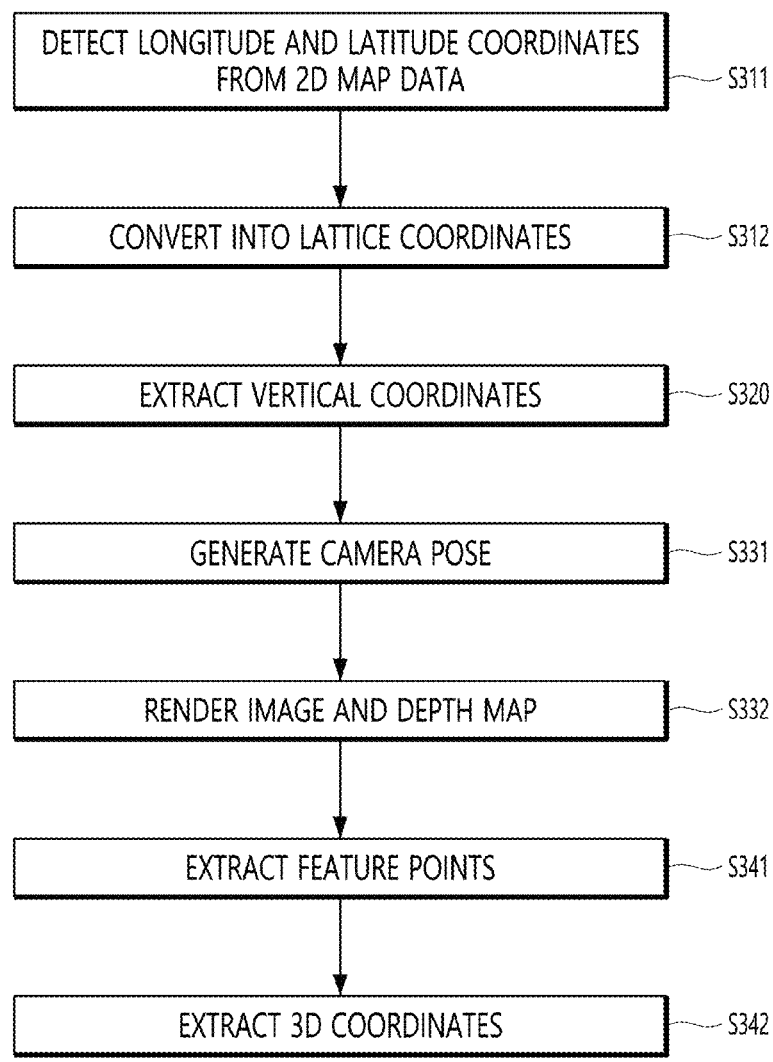
FIG. 18B is a detailed flowchart showing an embodiment of the flowchart of FIG. 18A.
Figure 19:
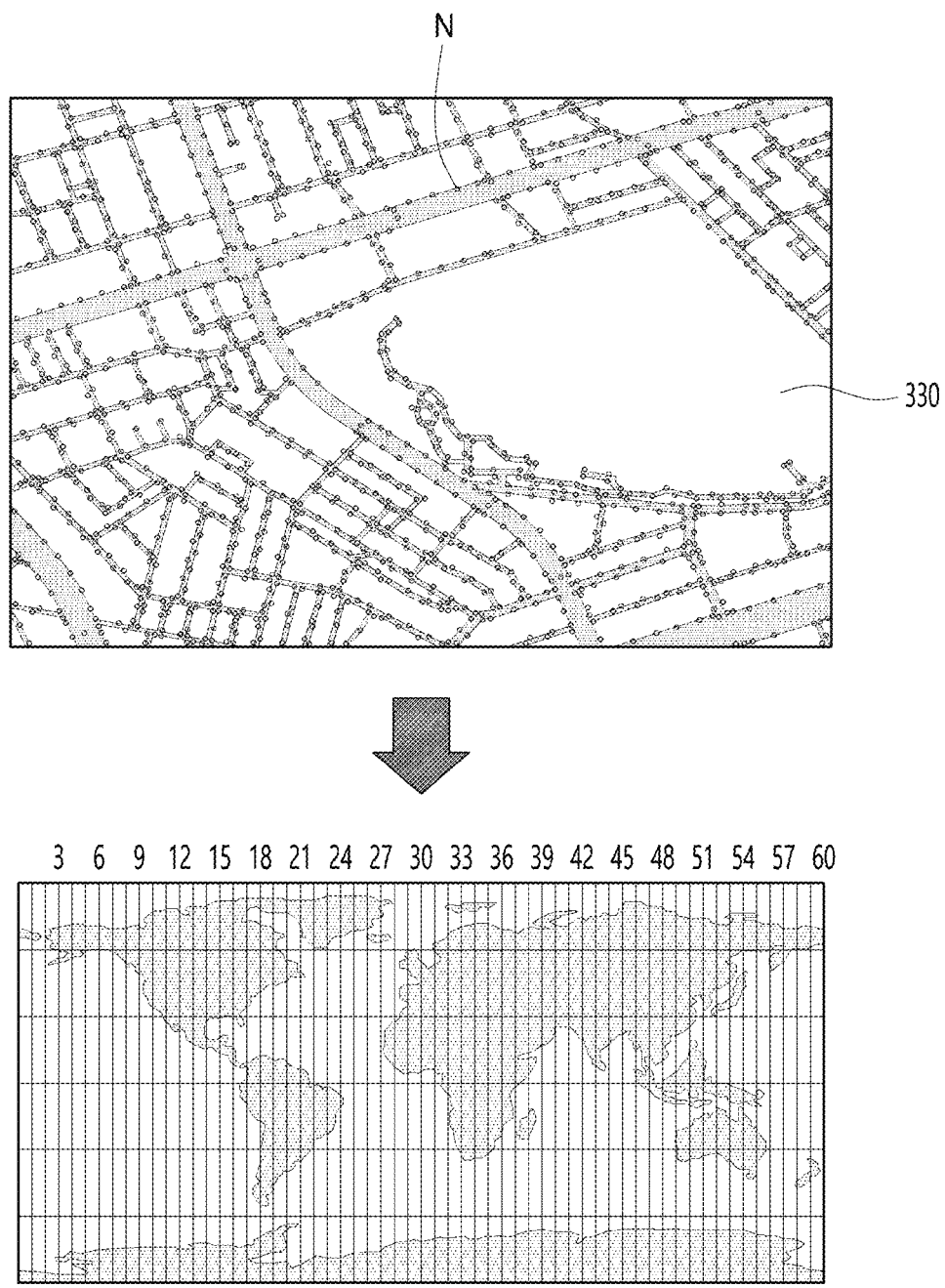
FIG. 19 is a conceptual view for explaining a method of generating lattice coordinates of FIG. 18B.
Figure 20:
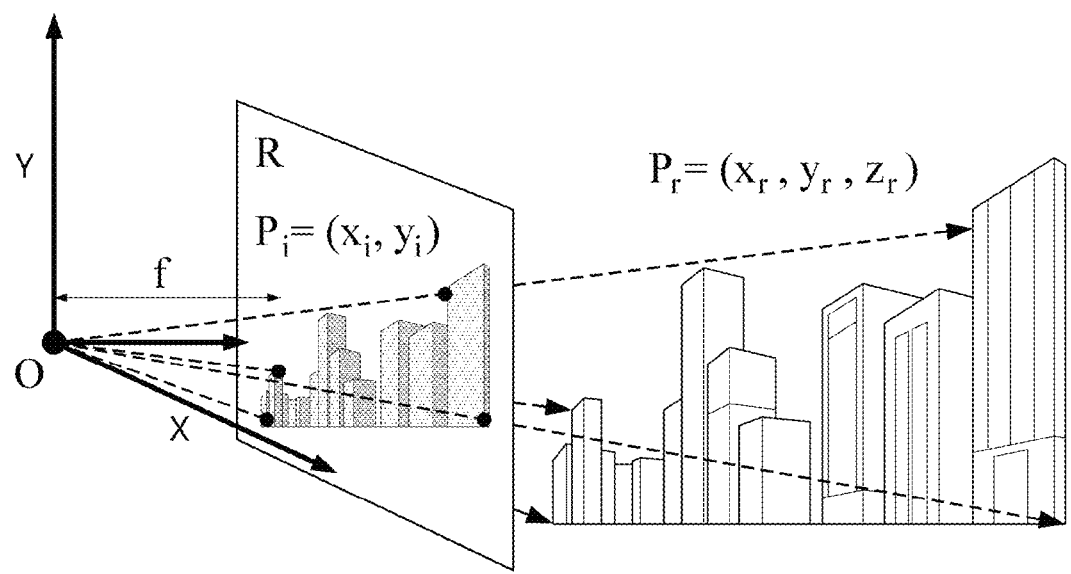
FIG. 20 is a conceptual view showing a camera pose which is to perform rendering.
Figure 21:
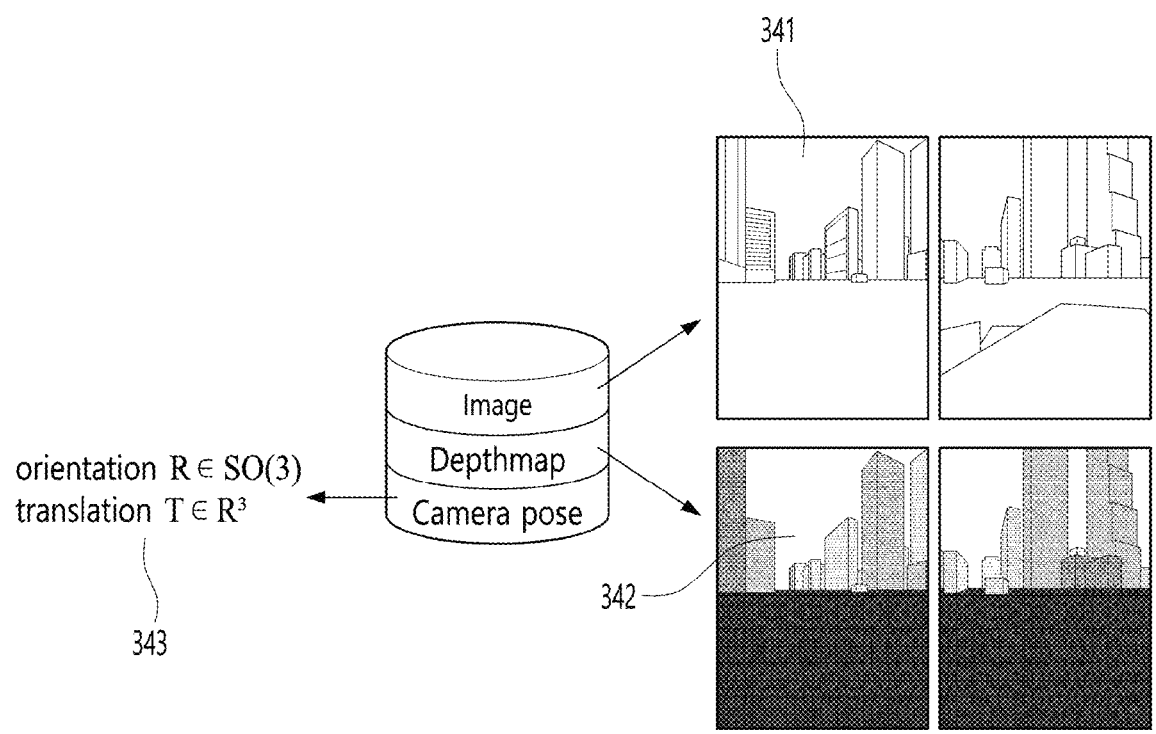
FIG. 21 is a conceptual view showing a data set established by processes of FIG. 18B.

FIG. 18B is a detailed flowchart showing an embodiment of the flowchart of FIG. 18A. FIG. 19 is a conceptual view for explaining a method of generating lattice coordinates of FIG. 18B. FIG. 20 is a conceptual view showing a camera pose which is to perform rendering. And FIG. 21 is a conceptual view showing a data set established by the processes of FIG. 18B.

Firstly, referring to FIG. 18B, the step of generating lattice coordinates (S310) may include a first step (S311) of detecting longitude and latitude coordinates from 2D map data, and a second step (S312) of converting the detected longitude and latitude coordinates into lattice coordinates.

In the first step (S311), longitude and latitude coordinates of nodes on the sidewalk are detected by using 2D map data.

The 2D map data may be map data provided from internet enterprises such as Naver or Google. As another example, the 2D map data may be map data publicized from the government and a government-affiliated organization, in an open application program interface (API) manner.

In this case, as shown in FIG. 19, the 2D map data 330 may be provided with coordinates information on the sidewalk. More specifically, the 2D map data 330 may be provided with plane coordinates of the sidewalk. As an example, the 2D map data 330 may be provided with nodes (N) sequentially arranged at preset intervals along the sidewalk, and may be data having longitude and latitude coordinates of the nodes (N).

The longitude and latitude coordinates have the prime meridian (or Greenwich meridian) and an equatorial plane as reference surfaces, and may be a coordinate system having information on a latitude, a longitude and a height. More specifically, the longitude and latitude coordinates may be GPS coordinates of a longitude and a latitude. And Korea may have a coordinate value by degree between 124°~132° east longitude and 33°~43° north latitude.

Next, in the second step (S312), the longitude and latitude coordinates are converted into the lattice coordinates. Referring to FIG. 4, the longitude and latitude coordinates may be converted into coordinates of a Universal Transverse Mercator (UTM) coordinate system. The UTM coordinate system is a 2D plane coordinate system, and may consist of UTM areas. The UTM coordinate system may have a lattice coordinate system for representing positions as a unified system.

As a method to convert the longitude and latitude coordinates into UTM coordinates, a UTM projection conversion may be used, for instance. In this case, the coordinate conversion method is not limited to a specific example, and various techniques applicable to at least some example embodiments may be considered. Thus, in this specification, there is no restriction thereon.

Further, as aforementioned, at least some example embodiments include a case that a coordinate conversion is not required in the step of generating lattice coordinates (S310). For instance, such a coordinate conversion may be excluded when 2D map data having lattice coordinates of the sidewalk is used.

Next, performed is extracting of vertical coordinates corresponding to the lattice coordinates from 3D model data which is based on an image captured from the air (S320). In this case, the extracting of the vertical coordinates may be a third step.

Here, the 3D model data may be model data of a city such as Seoul. For instance, a 3D model of a city scale may be established by using aerial photos of a large-scale area such as a city area.

The aerial photos may be provided with a plurality of picture images captured from the air while a camera is moving, and the 3D model data may be generated by using a disparity among the plurality of picture images. By using the disparity, 2D pictures obtained by capturing a 3D outdoor space may be retrieved to a 3D real world.

For instance, if the same object is captured while a camera is moving right and left, a change amount is large when the object is closer to the camera. On the contrary, the change amount is small when the object is far from the camera. Here, the change amount may be a disparity, and 3D may be retrieved from a plurality of 2D pictures by using a size of the change amount.

More specifically, a distance of an object projected onto an image is calculated by using a disparity. Then, spatial coordinates are calculated in unit of points by using matching points from a pose-estimated picture. In this case, consecutive 3D digital surfaces (DSM=Digital Surface Model) are generated by gathering dense matching results estimated from a plurality of images obtained by capturing the same area on different positions. The dense matching may be an algorithm which constitutes a cost volume by digitizing a similarity degree of a picture (master) to neighboring pictures (slaves) according to each depth by changing the depth ((Depth=Disparity) with respect to each pixel (x, y) of the picture (master). Further, since such an algorithm is used, the 3D model data may be provided with depth information of an object.

By the aforementioned method, may be implemented data represented by having a pseudo-color according to an elevation of a 3D digital surface, data having undergone a textual processing as an aerial photo as a 3D digital surface is completed into a 3D model, etc.

Further, the 3D model data is provided with a digital elevation model representing a bare earth of the outdoor space, and the vertical coordinates may be extracted from the digital elevation model. The digital elevation model has an elevation value of a ground surface, and coordinates in a direction perpendicular to the ground surface are extracted by using the elevation value. In this case, the vertical coordinates may be extracted as coordinates in a vertical direction at a spot corresponding to coordinates of the sidewalk included in the lattice coordinates.

Like this, as the lattice coordinates and the vertical coordinates are extracted, 3D coordinates may be defined along the sidewalk. Rendering an image of an outdoor space may be performed by using the 3D coordinates (S330).

The step of rendering an image of an outdoor space (S330) may include a fourth step (S331) and a fifth step (S332).

As shown in FIG. 20, in the fourth step (S331), a virtual camera which is to perform rendering may be set. More specifically, may be generated a virtual camera pose which is to perform rendering at a desired viewpoint by using the 3D coordinates. In order to establish a map for visual localization which is utilizable on the sidewalk, the desired viewpoint may be a sidewalk viewpoint. For instance, the pose includes a position and an orientation of a camera frame.

Referring to FIG. 20, a position of an origin point (O) is a position of a virtual camera. Here, a 3D model's direction to face a specific image may be calculated, and thereby a pose of the virtual camera is calculated.

More specifically, a ground control point (Pr) of FIG. 6 may be matched with the 3D coordinates, and a posture of an image (R) may be estimated on the basis of the ground control point (Pr). For such pose estimation, an aerial triangulation, e.g., a simultaneous bundle adjustment, etc. may be used. Once the posture of the image (R) is estimated, a position of the origin point (O) and a direction to face the image may be calculated.

In case of using a street view image obtained as a car moves around at streets for image capturing, it is impossible to obtain images at an area having no road. However, according to at least one example embodiment, since aerial photos are used, the virtual camera may be located at any desired position.

Once the virtual camera pose is generated, an image and a depth map are rendered in the fifth step (S332).

For instance, if the virtual camera pose is generated, an image 341 about the outdoor space viewed from the virtual camera may be rendered by using the 3D model data. In this case, a depth map 342 corresponding to the image 341 is rendered together with the image 341 about the outdoor space by using the virtual camera pose and the 3D model data.

Here, the depth map 342 may be a map representing a relative distance from the camera to an object on a 3D scene.

As shown in FIG. 21, the image 341, the depth map 342, and the camera pose 343 may be generated as a data set by rendering through the aforementioned processes.

Next, performed is a step of generating a feature point map (S340). The step of generating a feature point map (S340) may be a step of constructing a data set of a feature point map for visual localization on the sidewalk. More specifically, a map data set for visual localization is constructed by using the rendered image 341, the rendered depth map 342, and the camera pose 343 at the time of rendering. However, at least some example embodiments are not limited to this. For instance, it is also possible to construct a map data set for visual localization by using the rendered image and the camera pose.

As such an example, the step of generating a feature point map (S340) may include a sixth step (S341) and a seventh step (S342).

In the sixth step (S341), a feature point of an object positioned at the outdoor space is extracted by using the rendered image.

The object may be buildings 351, 352, etc. for instance. In this step, feature points 361 are extracted from the buildings 351, 352, etc.

Figure 23:
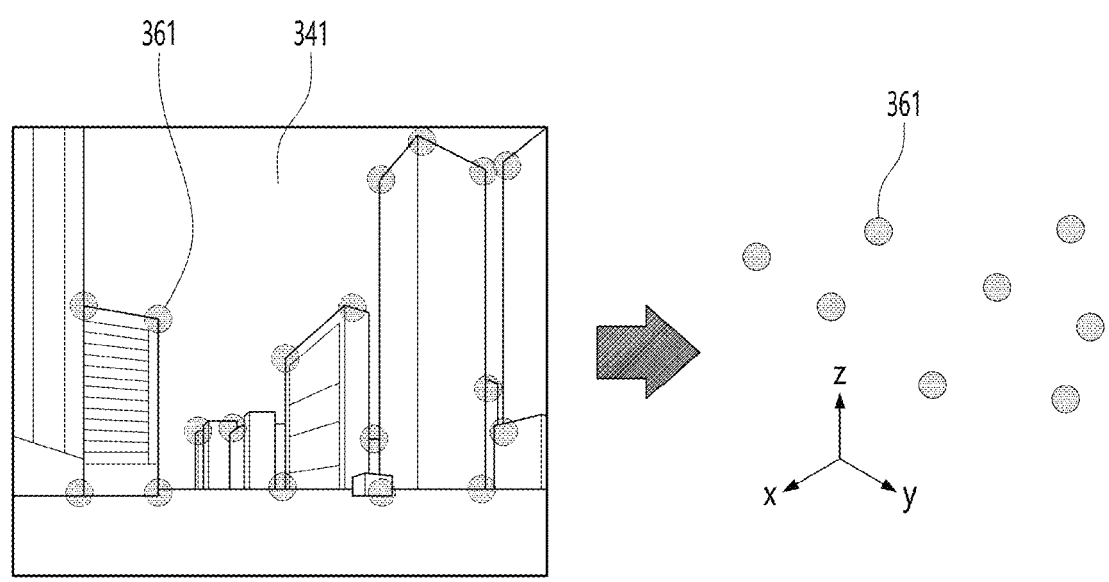
FIG. 23 is a conceptual view showing a method of extracting feature points and 3D coordinates from FIG. 18B.

In this case, as shown in FIG. 23, the feature points 361 of the rendered image 341 are extracted by using a feature point extraction technique. In this case, the feature point extraction technique is not limited to a specific example, and various techniques applicable to at least some example embodiments may be considered. Thus, in this specification, there is no restriction thereon.

Figure 22:
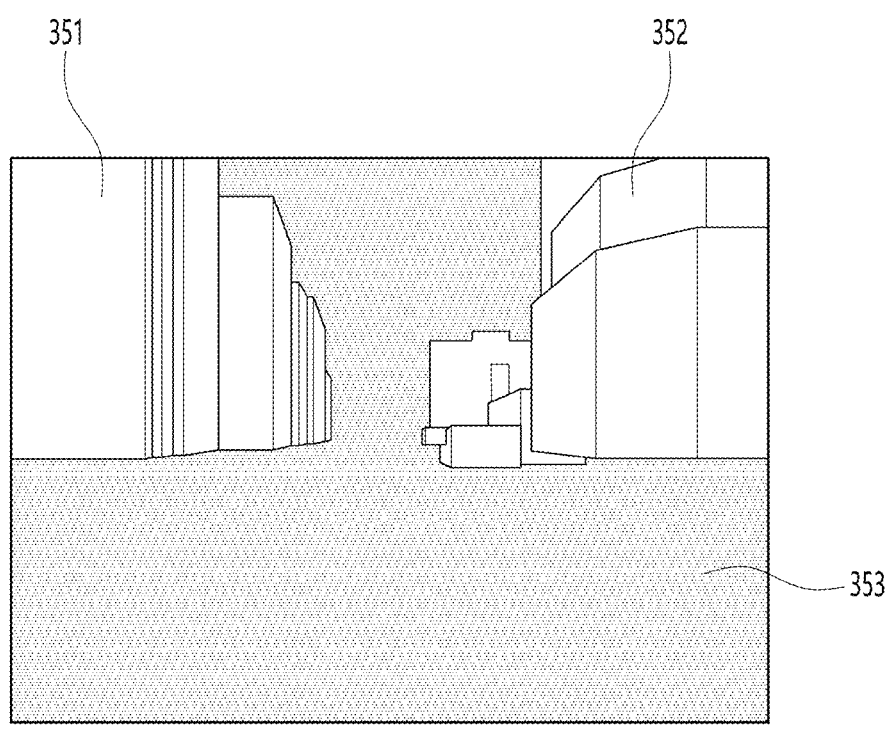
FIG. 22 is a conceptual view showing an example of an image rendered by the processes of FIG. 18B.

Here, as shown in FIG. 22, the rendered image may be an image rendered by excluding unnecessary objects. For instance, the unnecessary objects may be provided with at least one of trees, streets, persons and vehicles.

If unnecessary feature points are extracted from a region of a road, a tree, a person, and a car inside an image, performance of visual localization is lowered and accuracy of mapping is lowered. In order to prevent this, may be removed objects which dynamically move or which vary according to the season, such as roads, trees, persons and cars, from which feature points are extracted.

More specifically, unnecessary objects are excluded between the buildings 351, 352 at the time of rendering an image. Through this, as shown in FIG. 22, the image of the outdoor space may be provided with an image having no road between the buildings 351, 352 separated from each other. Thus, an image having only the buildings 351, 352 at a background 353 may be rendered.

Through such a method, according to at least one example embodiment, a spot which can be easily recognized even if some of objects are changed in shape, size or position and which can be easily found even if a camera viewpoint is changed, may be extracted as a feature point.

In this case, in the rendering of the image of the outdoor space, unnecessary objects and necessary objects may be distinguished from each other, and the unnecessary objects may be excluded from the image of the outdoor space.

Next, in the seventh step (S342), 3D coordinates of the feature points 361 are extracted by using the rendered depth map 342. More specifically, 3D coordinates of the extracted feature points 361 may be extracted by using the extracted feature points 361, the virtual camera pose 343, and the rendered depth map 342.

Through the aforementioned processes, the second feature point map may be a data set having the feature points, the 3D coordinates, and the virtual camera pose.

Before a server for visual localization is operated, features (targets or objects), feature points, and 3D coordinates of the feature points are extracted in advance to thus be stored. When the server is operated, visual localization is performed by using only the extracted features and the 3D coordinates of the feature points. This may reduce unnecessary calculations used to read an image and a depth map.

The aforementioned 3D map generated based on aerial photos can be used independently, as well as it is used for visual localization as a second feature point map as a part of integrated map data. For instance, it is possible to estimate a 3D position and a pose of a user who moves on foot with just a sheet of image, by utilizing the second feature point map.

As aforementioned, in the method of generating a map which is utilizable for visual localization and the visual localization method and system using the map according to at least one example embodiment, weakness of data is compensated by generating map data by using data of different viewpoints. This enables visual localization of high accuracy to be performed by using an image at a sidewalk viewpoint.

One or more of the elements disclosed above may include or be implemented in one or more processing circuitries such as hardware including logic circuits; a hardware/software combination such as a processor executing software; or a combination thereof. For example, the processing circuitries more specifically may include, but are not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:
1. A visual localization method, comprising:
generating a first feature point map by using first map data calculated on the basis of a first viewpoint, the first viewpoint being a road viewpoint;
generating a second feature point map by using second map data calculated on the basis of a second viewpoint different from the first viewpoint, the second viewpoint being an aerial viewpoint;
constructing map data for localization having the first and second feature point maps integrated with each other, by compensating for a position difference between a point of the first feature point map and a point of the second feature point map, the constructing the map data including,
calculating correspondences of feature points between an image of the first feature point map and an image of the second feature point map, and estimating a change of a camera pose with respect to the point of the first feature point map and the point of the second feature point map, by using the correspondences; and performing visual localization by using the map data for localization, wherein the image of the first feature point map is provided with a street view image captured at the road viewpoint, and the image of the second feature point map is provided with an image rendered at the road viewpoint by using 3D model data of an outdoor space.

2. The method of claim 1, wherein the generating of the first feature point map comprises:

detecting feature points of objects which satisfy a specific condition, from each of street view images captured at the road viewpoint;

generating a 3-dimensional (3D) point related to at least one of the street view images based on matching among the feature points; and generating data provided at the first feature point map by compensating for the 3D point and a pose of the at least one street view image.

3. The method of claim 2, wherein the at least one street view image is cropped into a plurality of images, and wherein the detecting of the feature points is performed with respect to the cropped plurality of images.

4. The method of claim 1, wherein the generating of the second feature point map comprises:

rendering an image of an outdoor space viewed from a virtual camera, by using a pose of the virtual camera and 3D model data; and generating data provided at the second feature point map by using the rendered image and a pose of the virtual camera, wherein the 3D model data is generated based on the image of the outdoor space captured at the aerial viewpoint.

5. The method of claim 4, wherein the generating of the data provided at the second feature point map comprises:

extracting a feature point of an object positioned at the outdoor space by using the rendered image, and extracting a 3D coordinate of the feature point by using a rendered depth map.

6. The method of claim 1, wherein the street view image is provided with a plurality of image tiles, and the plurality of image tiles are matched with the rendered image.

7. The method of claim 1, further comprising:

compensating for the camera pose corresponding to one of the first and second feature point maps based on another of the first and second feature point maps, through error optimization among the feature points of the image of the first feature point map and the image of the second feature point map.

8. The method of claim 1, further comprising:

matching one of the first feature point map and the second feature point map with another feature point map by scan matching.

9. The method of claim 8, wherein the second feature point map is provided with mesh information, and wherein the first and second feature point maps are matched with each other by comparing 3D points of the first feature point map with the mesh information of the second feature point map.

10. The method of claim 1, wherein the performing of the visual localization comprises:

extracting a feature point by receiving an input image;

extracting a reference image having data similar to the feature point of the input image from the map data for localization; and estimating a pose by using the reference image.

11. A visual localization system, comprising:

memory configured to store map data for localization; and processing circuitry included in a mobile device or an autonomous driving device, the processing circuitry configured to perform, generating a first feature point map using first map data calculated based on a first viewpoint, the first viewpoint being a road viewpoint, generating a second feature point map using second map data calculated based on a second viewpoint different from the first viewpoint, the second viewpoint being an aerial viewpoint, constructing map data for localization by compensating for a position difference between a point of the first feature point map and a point of the second feature point map, the map data including the first and second feature point maps, the constructing the map data including, calculating correspondences of feature points between an image of the first feature point map and an image of the second feature point map, and estimating a change of a camera pose with respect to the point of the first feature point map and the point of the second feature point map, by using the correspondences, and performing visual localization by using the map data for localization, the visual localization including matching the first and second feature point maps with each other by using a difference of a camera pose therebetween, wherein the image of the first feature point map is provided with a street view image captured at the road viewpoint, and the image of the second feature point map is provided with an image rendered at the road viewpoint by using 3D model data of an outdoor space.

12. The visual localization system of claim 11, wherein the processing circuitry is further configured to generate the first feature point map by:

detecting feature points of objects which satisfy a specific condition, from each of street view images captured at the road viewpoint;

generating a 3-dimensional (3D) point related to at least one of the street view images based on matching among the feature points; and generating data provided at the first feature point map by compensating for the 3D point and a pose of the at least one street view image.

13. The visual localization system of claim 12, wherein the at least one street view image is cropped into a plurality of images;

the processing circuitry is further configured to detect the feature points with respect to the cropped plurality of images; and the processing circuitry is further configured to generate the second feature point map by, rendering an image of an outdoor space viewed from a virtual camera, by using a pose of the virtual camera and 3D model data, and generating data provided at the second feature point map by using the rendered image and a pose of the virtual camera, wherein the 3D model data is generated based on the image of the outdoor space captured at the aerial viewpoint.

14. The visual localization system of claim 11, wherein the street view image is provided with a plurality of image tiles, and the plurality of image tiles are matched with the rendered image.

15. The visual localization system of claim 11, wherein the processing circuitry is further configured to perform:
compensating for the camera pose corresponding to one of the first and second feature point maps based on another of the first and second feature point maps, through error optimization among the feature points of the image of the first feature point map and the image of the second feature point map.

16. A non-transitory computer-readable medium storing computer-executable program instructions that, when executed by processing circuitry, cause the processing circuitry to perform operations including:
generating a first feature point map by using first map data calculated on the basis of a first viewpoint, the first viewpoint being a road viewpoint;
generating a second feature point map by using second map data calculated on the basis of a second viewpoint different from the first viewpoint, the second viewpoint being an aerial viewpoint;
constructing map data for localization having the first and second feature point maps integrated with each other, by compensating for a position difference between a point of the first feature point map and a point of the second feature point map, the constructing the map data including,
calculating correspondences of feature points between an image of the first feature point map and an image of the second feature point map, and
estimating a change of a camera pose with respect to the point of the first feature point map and the point of the second feature point map, by using the correspondences; and
performing visual localization by using the map data for localization, wherein
the image of the first feature point map is provided with a street view image captured at the road viewpoint, and the image of the second feature point map is provided with an image rendered at the road viewpoint by using 3D model data of an outdoor space.

17. The non-transitory computer-readable medium of claim 16, wherein the processing circuitry is further caused to perform the generating of the first feature point map by:
detecting feature points of objects which satisfy a specific condition, from each of street view images captured at the road viewpoint;
generating a 3-dimensional (3D) point related to at least one of the street view images based on matching among the feature points; and
generating data provided at the first feature point map by compensating for the 3D point and a pose of the at least one street view image.

18. The non-transitory computer-readable medium of claim 17, wherein
the at least one street view image is cropped into a plurality of images; and
the detecting of the feature points is performed with respect to the cropped plurality of images.

19. The non-transitory computer-readable medium of claim 16, wherein the processing circuitry is further caused to perform the generating of the second feature point map by:
rendering an image of an outdoor space viewed from a virtual camera, by using a pose of the virtual camera and 3D model data; and
generating data provided at the second feature point map by using the rendered image and a pose of the virtual camera,
wherein the 3D model data is generated based on the image of the outdoor space captured at the aerial viewpoint.

20. The non-transitory computer-readable medium of claim 19, wherein the processing circuitry is further caused to perform the generating of the data provided at the second feature point map by:
extracting a feature point of an object positioned at the outdoor space by using the rendered image, and
extracting a 3D coordinate of the feature point by using a rendered depth map.

* * * * *